(12) United States Patent
Zhao et al.

(10) Patent No.: US 10,772,305 B2
(45) Date of Patent: Sep. 15, 2020

(54) POULTRY AND GAME BIRD EGG INCUBATOR

(71) Applicant: Manna Pro Products, LLC, Chesterfield, MO (US)

(72) Inventors: Peter Zhao, Xuzhou (CN); Paul Hale Slinkard, Nashville, TN (US)

(73) Assignee: MANNA PRO PRODUCTS, LLC, Chesterfield, MO (US)

(*) Notice: Subject to any disclaimer, the term of this patent is extended or adjusted under 35 U.S.C. 154(b) by 251 days.

(21) Appl. No.: 15/971,509

(22) Filed: May 4, 2018

(65) Prior Publication Data

US 2019/0335717 A1 Nov. 7, 2019

(51) Int. Cl.
*A01K 41/06* (2006.01)
*A01K 41/04* (2006.01)
*A01K 41/02* (2006.01)

(52) U.S. Cl.
CPC .............. *A01K 41/06* (2013.01); *A01K 41/04* (2013.01); *A01K 41/023* (2013.01)

(58) Field of Classification Search
CPC ...... A01K 41/02; A01K 41/023; A01K 41/04; A01K 41/06
See application file for complete search history.

(56) References Cited

U.S. PATENT DOCUMENTS

| 1,815,927 | A |   | 7/1931  | McLean         |            |
|-----------|---|---|---------|----------------|------------|
| 2,176,745 | A |   | 10/1939 | Petersime et al.|           |
| 2,319,091 | A |   | 5/1943  | Smith et al.   |            |
| 3,543,726 | A | * | 12/1970 | Marsh ..........| A01K 41/00 |
|           |   |   |         |                | 119/319    |
| 3,543,729 | A | * | 12/1970 | Davis ..........| A01K 39/024|
|           |   |   |         |                | 119/80     |
| 3,584,605 | A | * | 6/1971  | Schwartz ......| A01K 41/023|
|           |   |   |         |                | 119/319    |

(Continued)

FOREIGN PATENT DOCUMENTS

| CN | 2616046 Y | 5/2004 |
|----|-----------|--------|
| CN | 2720808 Y | 8/2005 |

(Continued)

OTHER PUBLICATIONS

International Search Report and Written Opinion, dated Jul. 3, 2019, for related International application No. PCT/US2019/030908 (12 pgs.).

*Primary Examiner* — Magdalena Topolski
*Assistant Examiner* — Arfan Y. Sinaki
(74) *Attorney, Agent, or Firm* — Armstrong Teasdale LLP

(57) ABSTRACT

An egg incubator having a base assembly, a window, and a lid assembly. The base assembly including a base tray configured to support a plurality of eggs, a water trough beneath the base tray and configured to retain a quantity of water, and a motorized egg turner configured to periodically turn the plurality of eggs. The window is configured to be removably coupled to the base assembly. The lid assembly is coupled to the window. The base assembly, window, and the lid assembly enclose a main incubation chamber sized to hold a plurality of eggs therein. The lid assembly includes a heating element configured to heat the main incubation chamber to a desired temperature, and a circulating fan configured to generate an airflow over the heating element.

16 Claims, 23 Drawing Sheets

(56) References Cited

U.S. PATENT DOCUMENTS

| | | | | |
|---|---|---|---|---|
| 3,783,832 | A | * | 1/1974 | Marsh .................... A01K 41/06 |
| | | | | 119/319 |
| 4,215,651 | A | * | 8/1980 | Pearce ................... A01K 41/02 |
| | | | | 119/318 |
| 5,148,773 | A | * | 9/1992 | Ontiveros .............. A01K 41/00 |
| | | | | 119/319 |
| 5,690,055 | A | * | 11/1997 | Wenstrand ............. A01K 41/00 |
| | | | | 119/309 |
| 7,261,860 | B1 | * | 8/2007 | Vellinger ............... A01K 41/00 |
| | | | | 119/300 |
| 2017/0009202 | A1 | * | 1/2017 | Ramsing ................ C12M 23/50 |
| 2017/0181413 | A1 | * | 6/2017 | Bodenhamier ........ A01K 41/00 |
| | | | | 119/319 |

FOREIGN PATENT DOCUMENTS

| | | |
|---|---|---|
| CN | 203388080 U | 1/2014 |
| CN | 203709028 U | 7/2014 |
| RU | 2289917 C2 | 12/2006 |
| RU | 87871 U1 | 10/2009 |

\* cited by examiner

POULTRY AND GAME BIRD EGG INCUBATOR

FIELD

The field of the disclosure relates generally to poultry and game bird egg incubators and, more specifically, a compact egg incubator for small farms or residential bird hatching.

BACKGROUND

Many poultry or game bird farmers utilize an egg incubator to hatch their birds. Incubators generally provide a controlled climate and environment for producing healthy poultry and game birds.

Climate is typically controlled in terms of temperature and humidity for a given species of bird. Improper or inconsistent temperature or humidity may result in damage to the eggs, embryos, or the birds once they hatch. For example, excessive temperature or insufficient humidity may damage the embryos. Further, an incubator allows the eggs to rest undisturbed other than, in certain incubators, to periodically turn the eggs. For example, chickens periodically roll their eggs to prevent the embryos from sticking to the shell of the egg. Some incubators turn the eggs periodically to mimic this behavior for at least a portion of the incubation period, and usually up to a certain amount, or predetermined period, of time before an expected hatch.

Conventional small low-cost incubators are typically Styrofoam or molded plastic and utilize a simple electric heat source and a water tray to provide humidity. Such a heat source may be controlled by a thermostat, and the water tray must be accessed within the incubator and refilled manually to produce an imprecise humidity level within the incubator, where too little water yields too little humidity, and too much water yields excessive humidity. Such water trays are further disadvantageous because the incubator must be opened each time to gain access to the water tray. More advanced, i.e., more costly, incubators may include a "humidity pump," or an external humidity source that injects moist air into the incubator. Basic incubators generally do not include a mechanism for turning the eggs, which leaves the user with turning the eggs manually. Again, more costly incubators may include an automatic egg turning mechanism. For example, certain known incubators include a tray onto which one or more eggs are placed, and the tray periodically tilts the eggs in alternating directions. In another example, the tray includes a set of motorized rolling pins onto which the eggs are placed, and the rolling pins periodically rotate to roll the eggs. In either case, with such automated egg turning mechanisms, the eggs should be removed from the mechanism a certain amount of time before hatch to allow the bird to position itself for hatching.

BRIEF DESCRIPTION

One aspect of the incubator described herein includes a base assembly, a window, and a lid assembly. The base assembly including a base tray configured to support a plurality of eggs, a water trough beneath the base tray and configured to retain a quantity of water, and a motorized egg turner configured to periodically turn the plurality of eggs. The window is removably coupled to the base assembly. The lid assembly is coupled to the window. The base assembly, window, and the lid assembly enclose a main incubation chamber sized to hold a plurality of eggs therein. The lid assembly includes a heating element configured to heat the main incubation chamber to a desired temperature, and a circulating fan configured to generate an airflow over the heating element.

One aspect of the motorized egg turner described herein includes a base tray, an egg turner wheel, and an electric motor. The base tray is sized to receive a plurality of eggs thereon. The egg turner wheel is axially-spaced from the base tray. The egg turner wheel includes a hub having a shaft aperture defined therein, a first ring concentric with the hub, and a first plurality of spokes extending radially from the hub to the first ring and defining a first plurality of compartments sized to respectively receive the plurality of eggs therein. The electric motor includes a drive shaft extending axially through the shaft aperture of the hub. The electric motor is configured to rotate the drive shaft and the egg turner wheel with respect to the base tray, and is further configured to cause the first plurality of spokes to engage the plurality of eggs to turn the plurality of eggs.

DETAILED DESCRIPTION

Embodiments of the egg incubators described herein include a low-cost molded plastic incubator having an automatic temperature and humidity control. Temperature is monitored by a thermostat and heat is provided by an electric heating element. Humidity is provided by one or more water troughs integrated into a base of the incubator and refillable by an external water port that enables filling without opening the main chamber of the incubator. Humidity is further controlled by use of two or more water troughs that can be filled independently via respective external water ports. Humidity is further controlled by a humidity adjustment knob that provides finer control. Certain embodiments of the egg incubators described herein provide an automatic egg turner. The egg turner includes a motorized egg turner wheel that is low-profile and removable from the incubator without handling the eggs themselves. Removal of the motorized egg turner wheel disables turning of the eggs and also enables easy cleaning of the egg turner disc. Embodiments of the egg turner described herein further enable eggs to be turned while lying in a flat position that improves heat distribution and avoids hot spots and cold spots that may occur when the eggs sit on-end or tilted in conventional egg turning trays, i.e., putting one end nearer a heating element, which ultimately can affect hatch rate. Certain embodiments of the egg incubators described herein provide a clear window providing up to 360 degrees of visibility around the incubator. Certain embodiments of the egg incubators described herein provide an egg candler integrated into the egg incubator. For example, in one embodiment, an egg candler is integrated into a lid assembly of the incubator, enabling embryo verification without an extra piece of equipment.

Figure 1A:
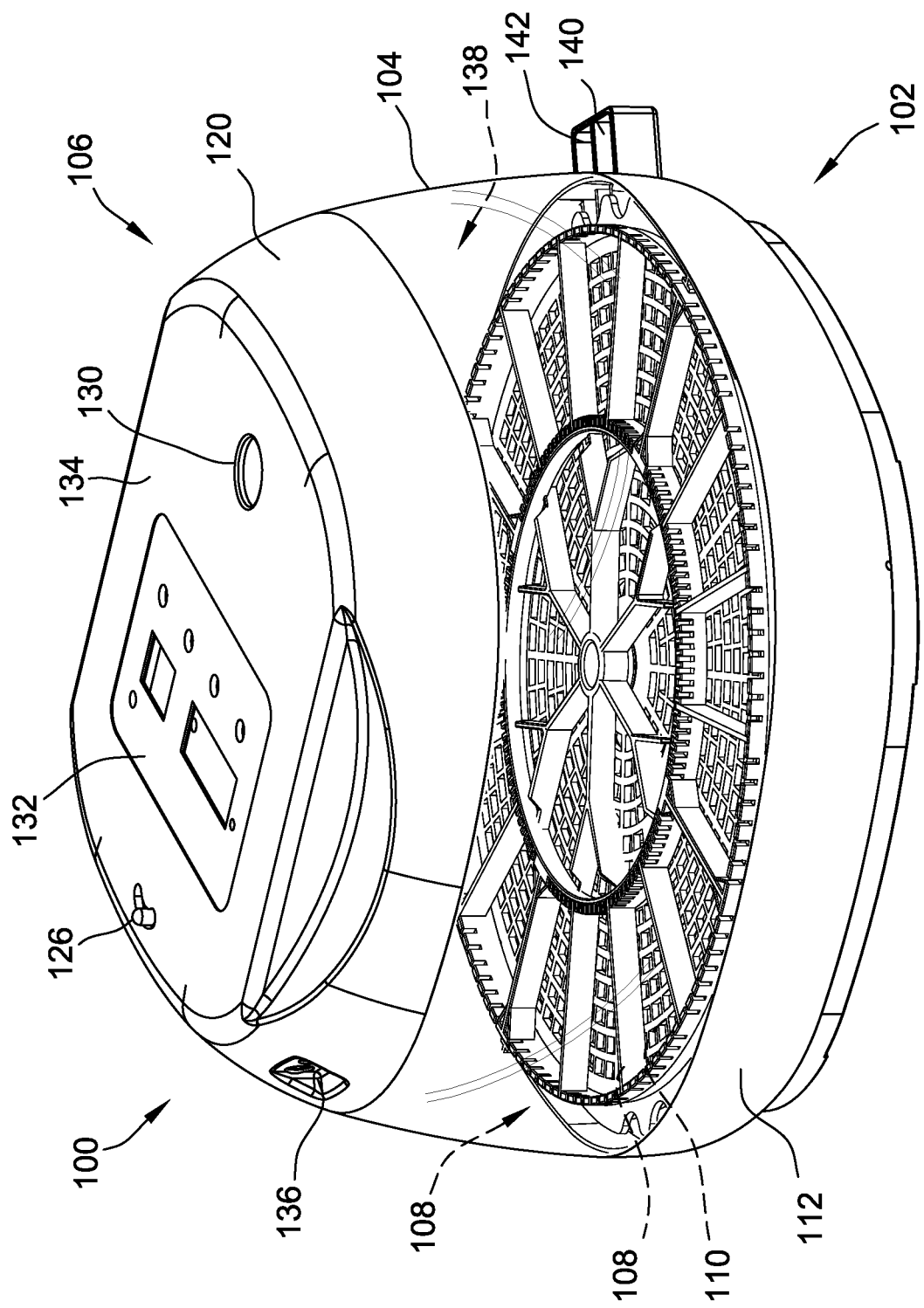
FIG. 1A is a perspective diagram of one embodiment of an egg incubator.
Figure 1B:
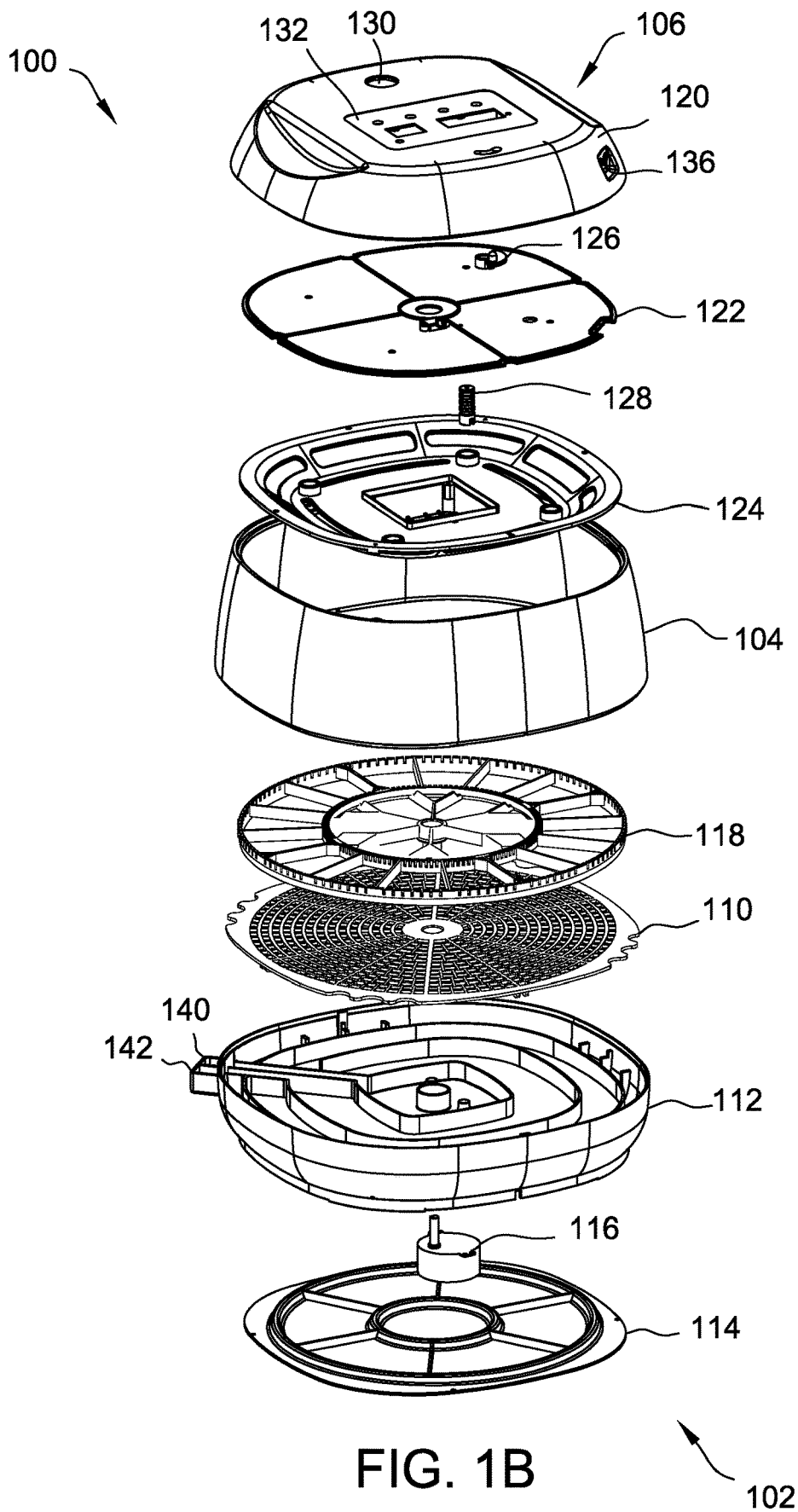
FIG. 1B is an exploded diagram of the egg incubator shown in FIG. 1A.
Figure 2:
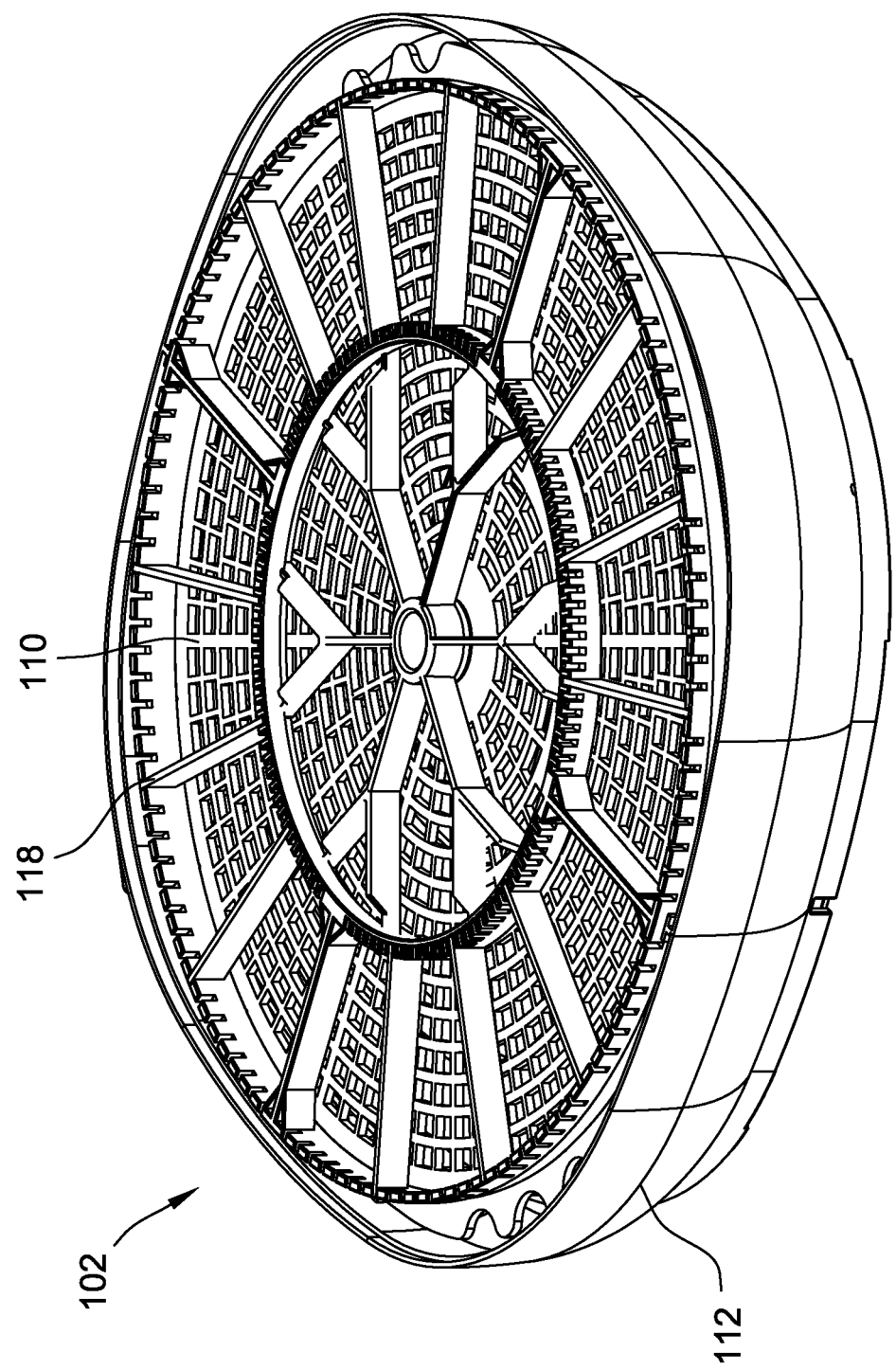
FIG. 2 is a perspective diagram of a base assembly of the egg incubator shown in FIG. 1A and FIG. 1B.

FIG. 1A is a perspective diagram of one embodiment of an egg incubator 100. FIG. 1B is an exploded diagram of egg incubator 100, shown in FIG. 1A. Egg incubator 100 includes a base assembly 102, a window 104, and a lid assembly 106. FIG. 2 is a perspective diagram of base assembly 102 of egg incubator 100, shown in FIG. 1A and FIG. 1B. Base assembly 102 includes a motorized egg turner 108, a base tray 110, a base 112, and a bottom tray 114. Motorized egg turner 108 includes an electric motor 116 and an egg turner wheel 118. Lid assembly 106 includes a lid 120, a top air deflector 122, a bottom air deflector 124, a humidity adjustment knob 126, and a heating element bracket 128. Lid assembly 106 includes an egg candler 130 and a control panel 132 integrated into a top surface 134 of lid 120. Lid 120 includes a power port 136 that receives a power input connector such as, for example, a direct current (DC) power connector or an alternating current (AC) power connector (not shown).

Egg incubator 100 defines a main incubator chamber 138 within which a plurality of eggs may be placed for incubation. Eggs rest on base tray 110, beneath which water at least partially fills base 112 for providing humidity to main incubator chamber 138. Water is supplied to base 112 via a first water port 140 and a second water port 142. Humidity is further controlled by humidity adjustment knob 126, which operates by adjusting the size of the vent through which moisture may escape main incubator chamber 138.

Main incubator chamber 138 is supplied heat by an electric heating element 148 that couples, for example, to heating element bracket 128. The heating element may include, for example, a length of wire that emits heat when supplied a current. Current supplied to the heating element 148 is regulated by control panel 132. Control panel 132 includes a temperature sensor (not shown) that measures a temperature of main incubator chamber 138 and compares the measurement to a desired temperature, or temperature set point. The temperature set point is manually entered by a user through control panel 132 and stored in a memory. Control panel 132 includes a processor (not shown) programmed to function as a thermostat to control the heating element 148. For example, when the measured temperature falls below the temperature set point, the processor energizes the heating element 148 for a period of time or until the measured temperature rises above the temperature set point. In certain embodiments, the heating element 148 is energized for limited periods of time. For example, in one embodiment, the heating element 148 may be limited to five minute periods of operation to minimize stress on the heating element 148 and its power circuit. In alternative embodiments, the time period may be longer or shorter depending on the implementation and the heating element's tolerance for continuous operation.

In certain embodiments, the temperature set point may include a hysteresis such that the measured temperature must fall some number of degrees below the temperature set point before the processor energizes the heating element, and the measured temperature must rise some number of degrees above the temperature set point before the processor de-energizes the heating element. For example, in one embodiment, where the temperature set point is 99.5 degrees Fahrenheit (F), the heating element is not energized until the measured temperature falls below 99.0 degrees F., and the heating element is not de-energized until the measured temperature rises above 100.0 degrees F.

Heated air is supplied to main incubator chamber 138 by a circulating fan 144. Circulating fan 144 draws air from main incubator chamber 138 through an inlet (not shown), across the heating element, and out through outlet vents 146.

Figure 3A:
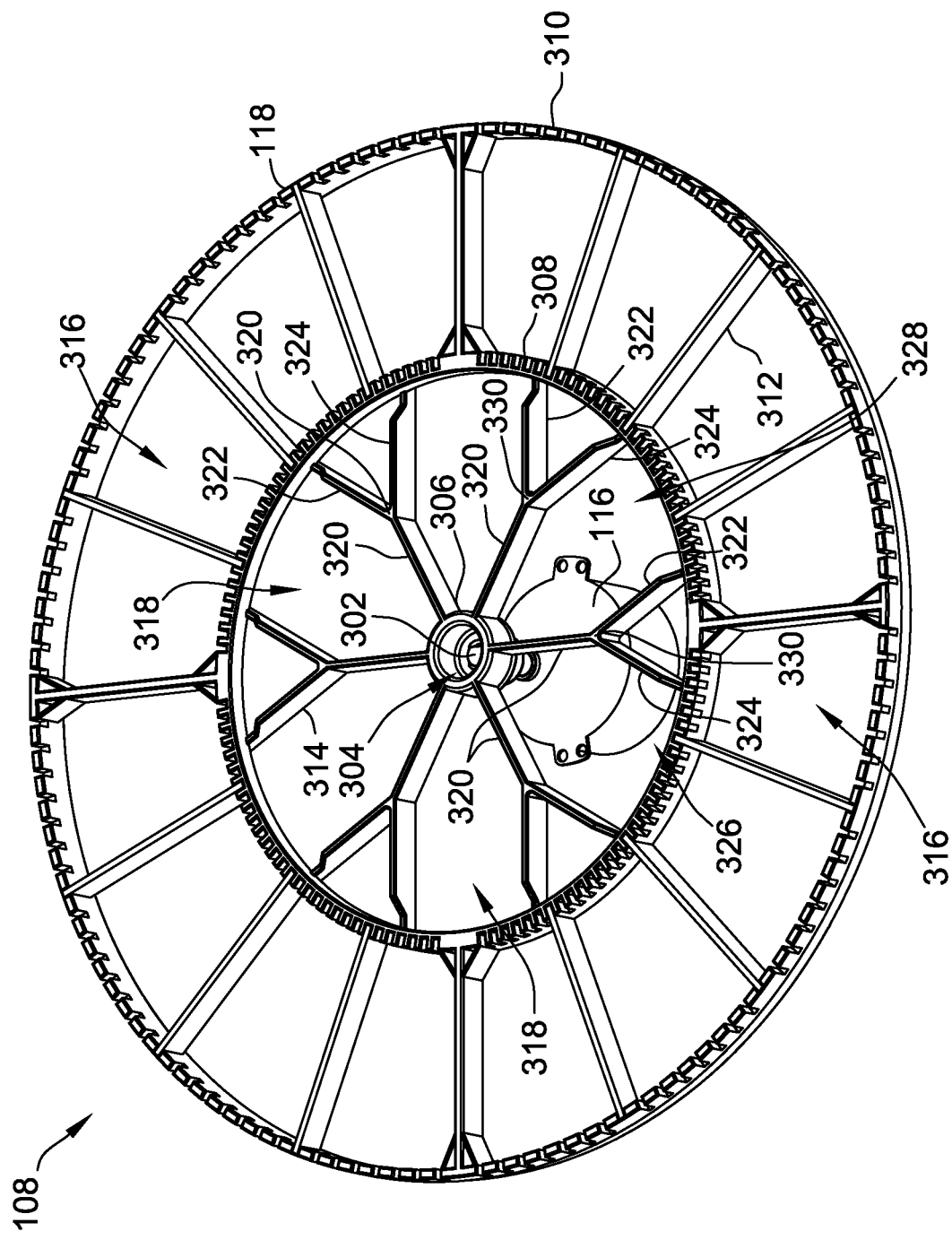
FIG. 3A is a top perspective diagram of one embodiment of a motorized egg turner of the egg incubator shown in FIG. 1A and FIG. 1B.
Figure 3B:
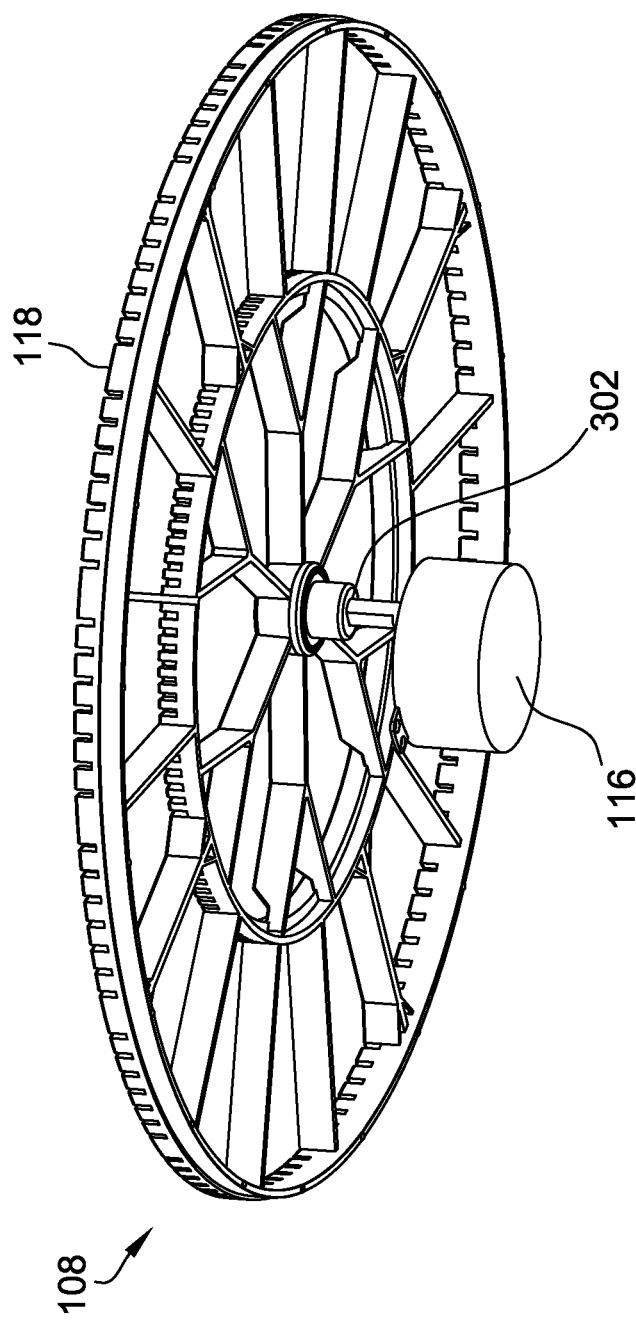
FIG. 3B is a bottom perspective diagram of the motorized egg turner shown in FIG. 3A.
Figure 3C:
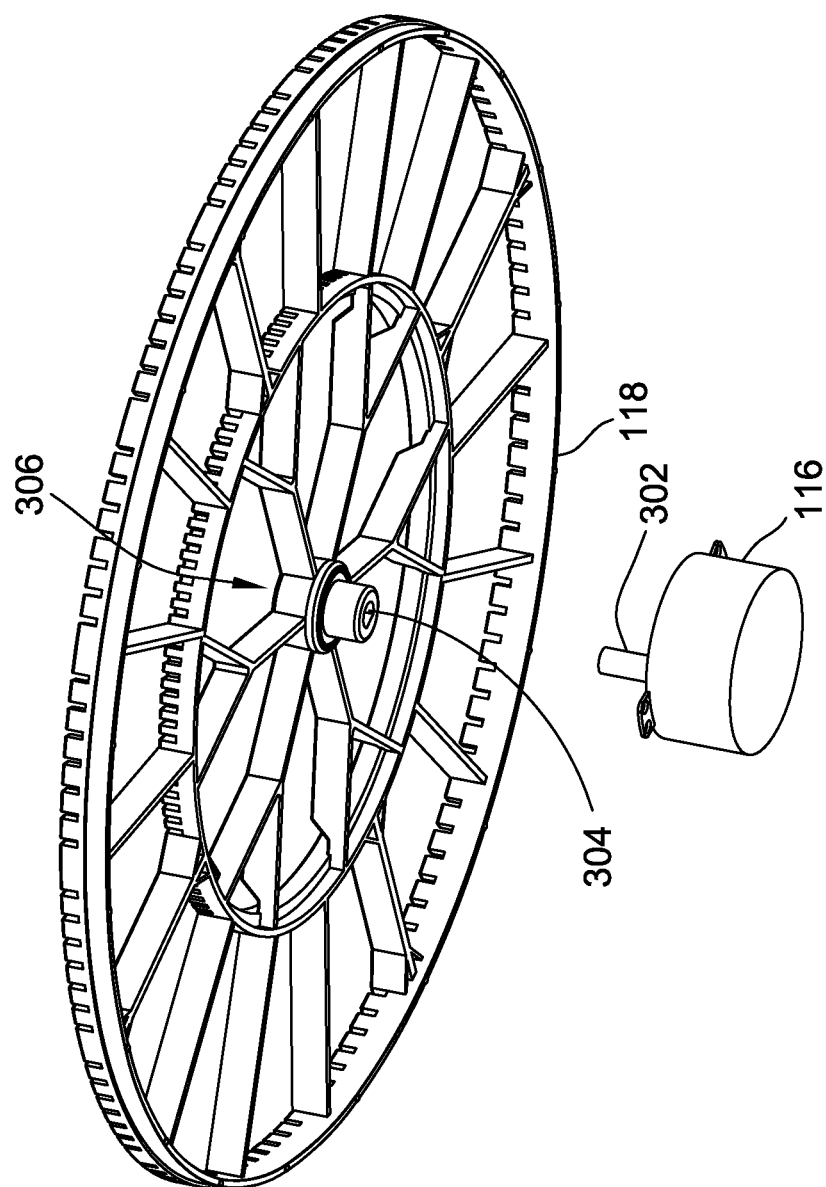
FIG. 3C is an exploded diagram of the motorized egg turner shown in FIG. 3A.

FIG. 3A is a top perspective diagram of motorized egg turner 108 of egg incubator 100, shown in FIG. 1A and FIG. 1B. FIG. 3B is a bottom perspective diagram of motorized egg turner 108, shown in FIG. 3A. FIG. 3C is an exploded diagram of motorized egg turner 108, shown in FIG. 3A. Motorized egg turner 108 includes egg turner wheel 118, axially-spaced from base tray 110, and electric motor 116. Electric motor 116 includes a drive shaft 302 keyed to mate a shaft aperture 304 in a hub 306 of egg turner wheel 118. Egg turner wheel 118 is a wheel fabricated of, for example, plastic or other light-weight and low-cost material. Hub 306 engages drive shaft 302 and, in certain embodiments, rests freely without any fastener securing egg turner wheel 118 to drive shaft 302, thereby enabling easy removal of egg turner wheel 118 from drive shaft 302 and egg incubator 100 at an appropriate time during incubation. In alternative embodiments, egg turner wheel 118 may be fastened to drive shaft 302 by any suitable fastener, such as, for example, a set screw.

Egg turner wheel 118 includes an inner ring 308 and an outer ring 310. Outer ring 310 is concentric with inner ring 308, and is spaced radially outward from inner ring 308. Egg turner wheel 118 further includes spokes 312, or radial spokes, extending radially from inner ring 308 to outer ring 310, and spokes 314, or radial spokes, extending radially from hub 306 to inner ring 308. Spokes 312 are circumferentially-spaced from adjacent ones of spokes 312, and spokes 314 are circumferentially-spaced from adjacent ones of spokes 314. Together, spokes 312, inner ring 308, and outer ring 310 define compartments 316 and 318 within which respective eggs rest.

Each of spokes 312 includes a radial member 320, a first diverging member 322, and a second diverging member 324. Radial member 320 extends from hub 306 toward inner ring 308 to define a portion of a boundary between a first compartment 326 and a second compartment 328, of compartments 318, where first compartment 326 and second compartment 328 are adjacent. In certain embodiments, radial member 320 extends all the way to inner ring 308. In other embodiments, radial member 320 extends only partially toward inner ring 308.

First diverging member 322 extends from radial member 320 at an intermediate position 330 between hub 306 and inner ring 308. First diverging member 322 extends obliquely from radial member 320 to inner ring 308 to define a portion of a boundary of first compartment 326. Second diverging member 324 extends obliquely from radial member 320 at intermediate position 330 to inner ring 308 to define a portion of a boundary of second compartment 328. For adjacent spokes 312, a first diverging member 322 of a first spoke 312 that defines a first portion of the boundary of first compartment 326, is parallel to a second diverging member 324 of a second spoke 312 that defines a second portion of the boundary of first compartment 326.

When egg turner wheel 118 is turned by electric motor 116, spokes 312 and 314 engage their respective eggs to turn the eggs. Spokes 312 and 314 are low-profile so as to not consume excessive amounts of space within main incubation chamber 138, but are of sufficient height to properly engage the eggs to turn the eggs. For example, spokes 312 and 314, in one embodiment are approximately 10 millimeters (mm) tall. In alternative embodiments, spokes 312 and 314 may have a height in the range of 5 mm to 40 mm depending on the species of bird for which eggs are being incubated. For example, larger eggs may require spokes 312 and 314 to be taller to properly engage the eggs. Likewise, spokes 312 and 314 may be smaller for engaging smaller eggs. Advantageously, spokes 312 and 314 enable the eggs to lay flat for turning, as opposed to on-end in conventional egg turners. When the eggs lay flat, they will turn approximately on their longitudinal axis, i.e., the axis extending from end to end. At least some known conventional egg turners hold the eggs on-end in a cradle that periodically tilts to turn the egg. Such turning is approximately about an axis that is normal to the longitudinal axis of the eggs. Turning the eggs while flat, i.e., on their longitudinal axis, results in more-even heating and avoids the development of hot and cold spots within the egg that can affect hatch rate. Such hot and cold spots may occur in conventional egg incubators that utilize single-point heat sources, e.g., heat lamps, and egg turners that hold eggs on-end, because the bottom end of the egg in the cradle, while it does periodically move closer to the heat source, is always further from the heat source than the top end.

Together, spokes 314, hub 306, and inner ring 308 define compartments 318 within which respective eggs rest. Inner ring 308, outer ring 310, spokes 312, and spokes 314 are dimensioned such that compartments 316 and 318 are large enough for an egg to pass through, thereby enabling removal of egg turner wheel 118 from egg incubator 100 without having to handle eggs. Accordingly, the dimensions of compartments 316 and 318 may vary for each species of bird for which eggs are being incubated. By allowing eggs to pass through compartments 316 and 318, manual handling of eggs during incubation is reduced, thereby reducing time required to remove egg turner wheel 118 and reducing the risk of cracking eggs. Conversely, conventional egg turners are more complex and costly, utilizing cradles that rock in alternating directions to turn the eggs. When egg turning is to cease, such conventional egg turners then require a user to manually move eggs from the cradles which is time consuming and risks damaging the eggs.

Figure 4:
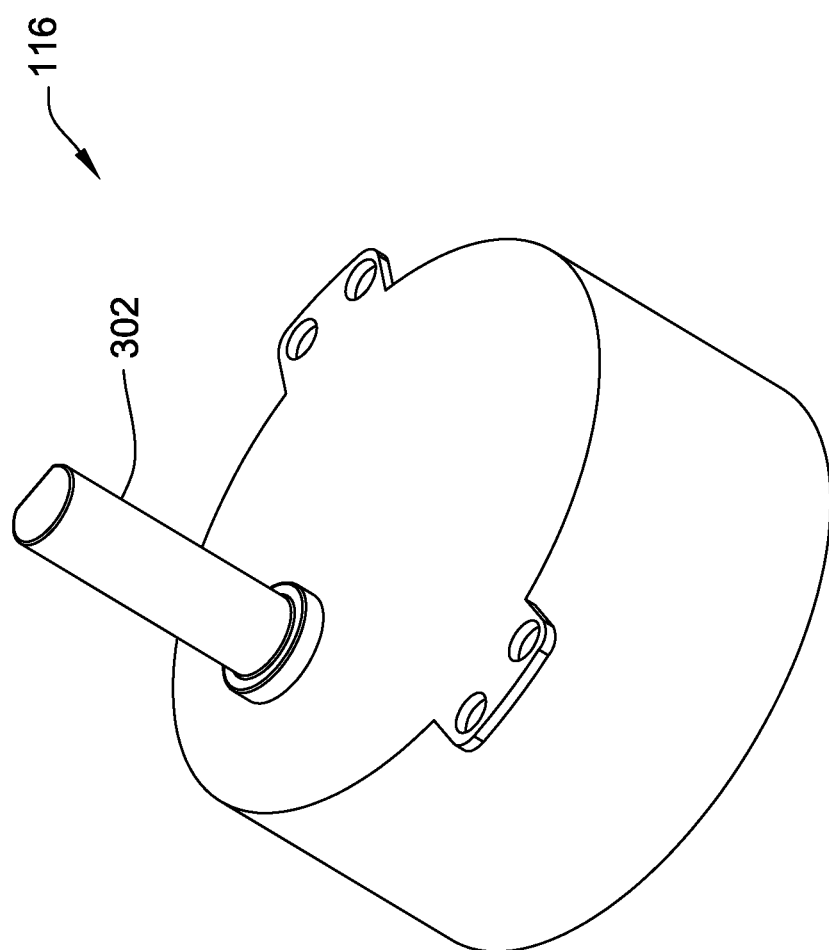
FIG. 4 is a perspective diagram of one embodiment of an electric motor for use in the motorized egg turner shown in FIGS. 3A, 3B, and 3C.

FIG. 4 is a perspective diagram of one embodiment of electric motor 116 for use in motorized egg turner 108 shown in FIGS. 3A, 3B, and 3C. Electric motor 116 includes drive shaft 302 that is keyed to mate shaft aperture 304. Electric motor 116 may be any suitable motor for turning egg turner wheel 118, including, for example, a DC stepper motor. Electric motor 116 is controlled by control panel 132, shown in FIG. 1A and FIG. 1B. More specifically, the processor (not shown) controls one or more switches to couple and decouple power from stator windings of electric motor 116.

Figure 5A:
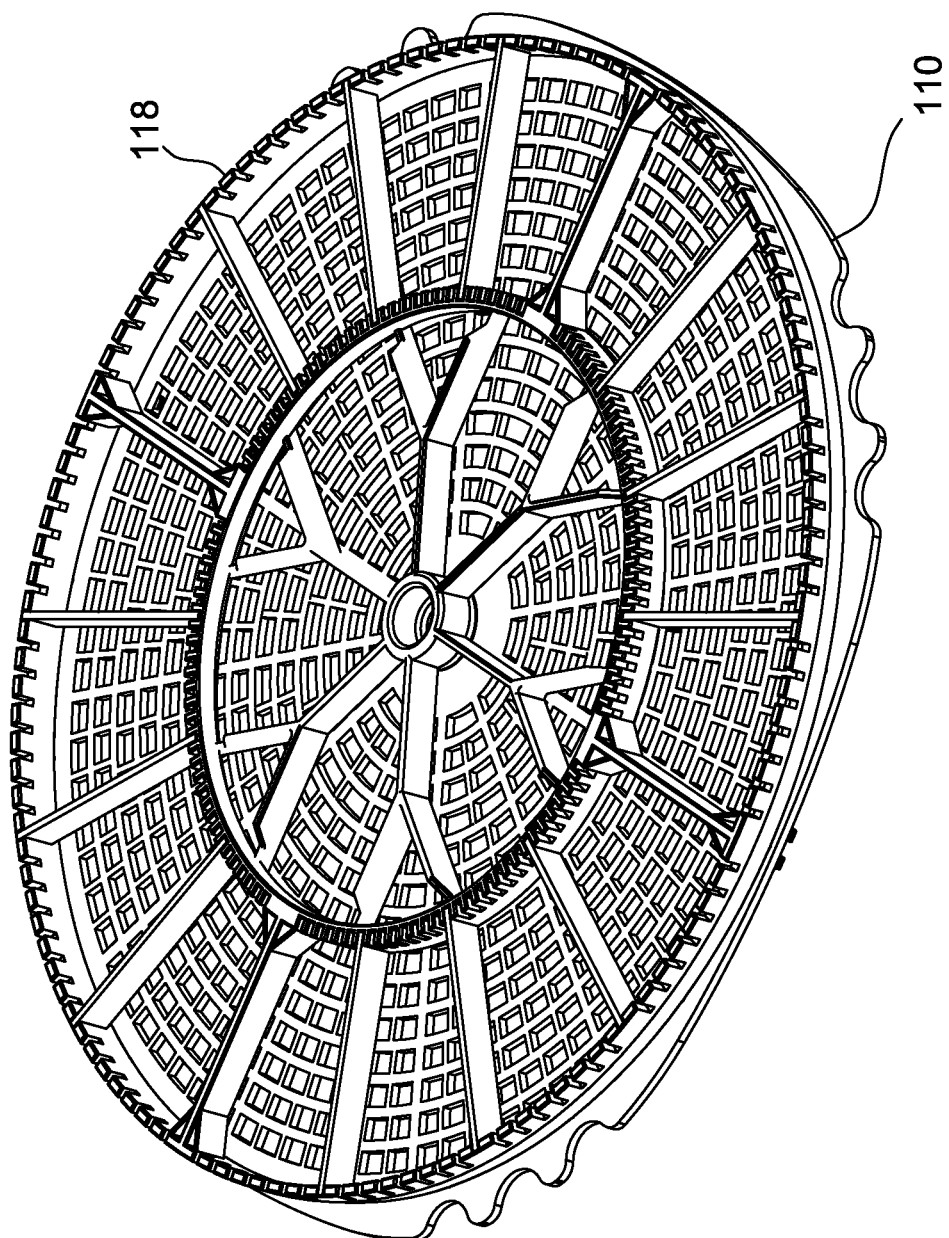
FIG. 5A is a perspective diagram of a base tray for use in the egg incubator shown in FIG. 1A and FIG. 1B, and the egg turner wheel shown in FIGS. 3A, 3B, and 3C.
Figure 5B:
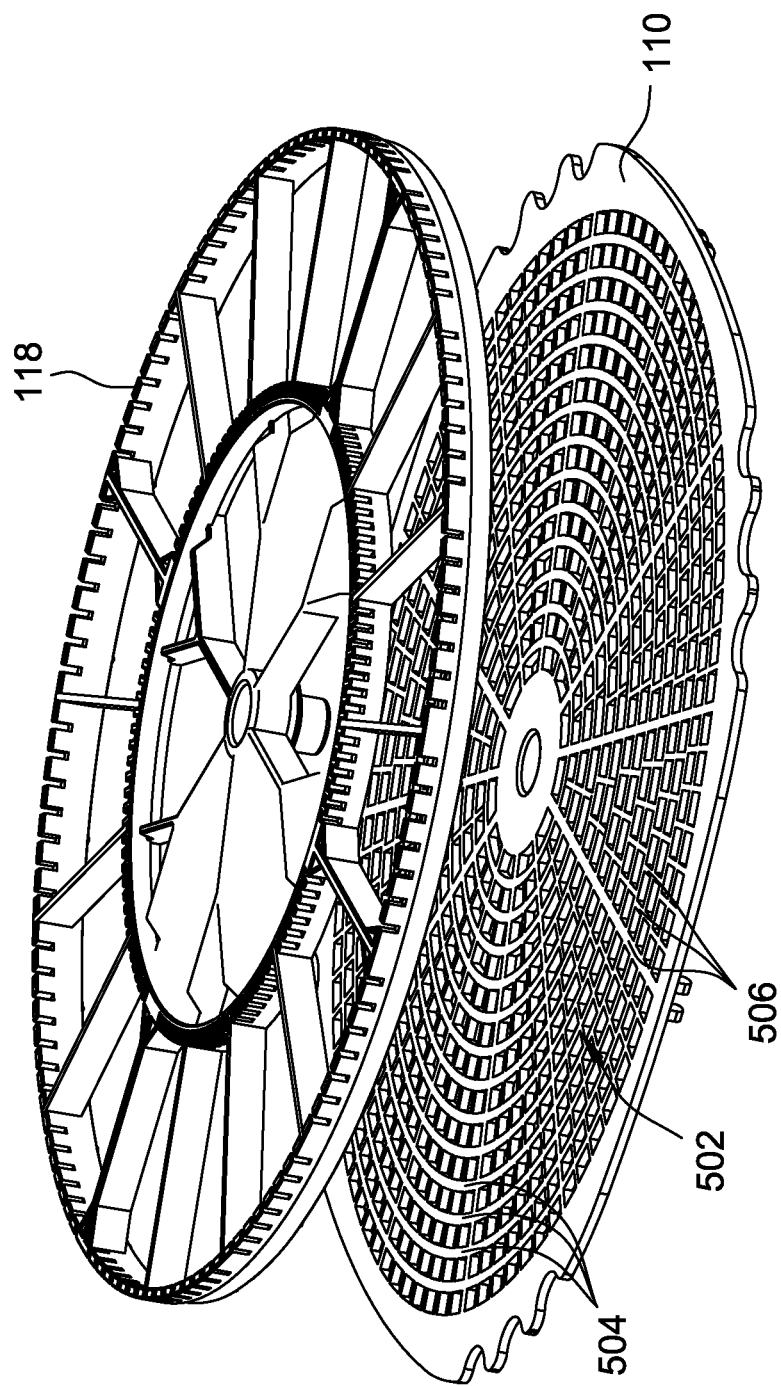
FIG. 5B is an exploded diagram of the base tray and the egg turner wheel shown in FIG. 5A.

FIG. 5A is a perspective diagram of base tray 110 for use in egg incubator 100 shown in FIG. 1A and FIG. 1B, and egg turner wheel 118, shown in FIGS. 3A, 3B, and 3C. FIG. 5B is an exploded diagram of base tray 110 and egg turner wheel 118, shown in FIG. 5A. Base tray 110 provides a surface on which eggs are placed for incubation within main incubator chamber 138. Base tray 110 includes a radial lattice structure 502 defined by a plurality of concentric rings 504 and radial members 506. In alternative embodiments, base tray 110 utilizes any suitable structure that enables sufficient airflow through base tray 110 and around eggs resting on base tray 110. For example, in one alternative embodiment, base tray 110 utilizes a quadrilateral grid of voids to provide sufficient airflow. In other embodiments, base tray 110 may utilize dedicated portals for airflow with which incubating eggs do not interfere.

Figure 6A:
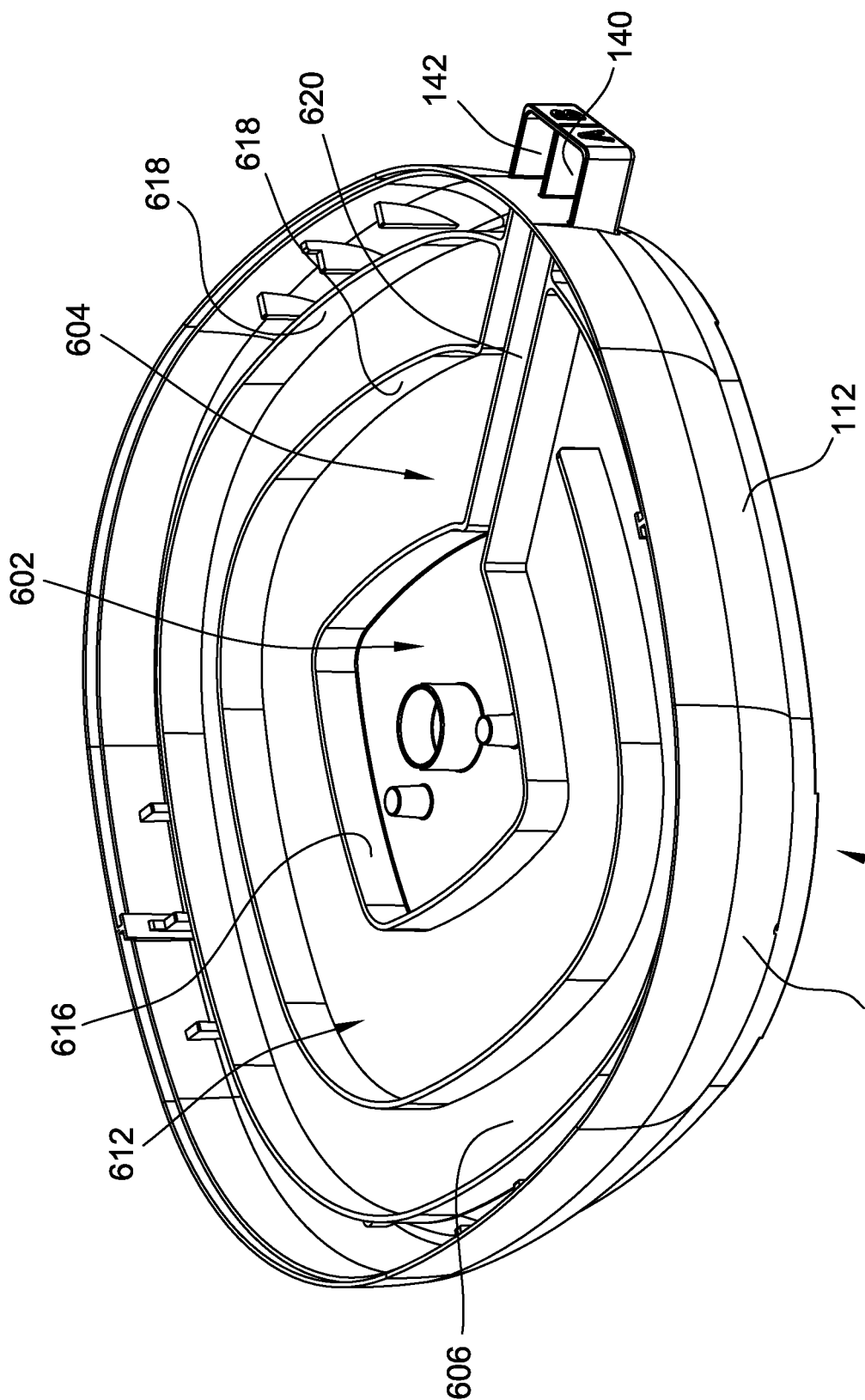
FIG. 6A is a perspective diagram of one embodiment of water troughs integrated into a base of the egg incubator shown in FIG. 1A and FIG. 1B.
Figure 6B:
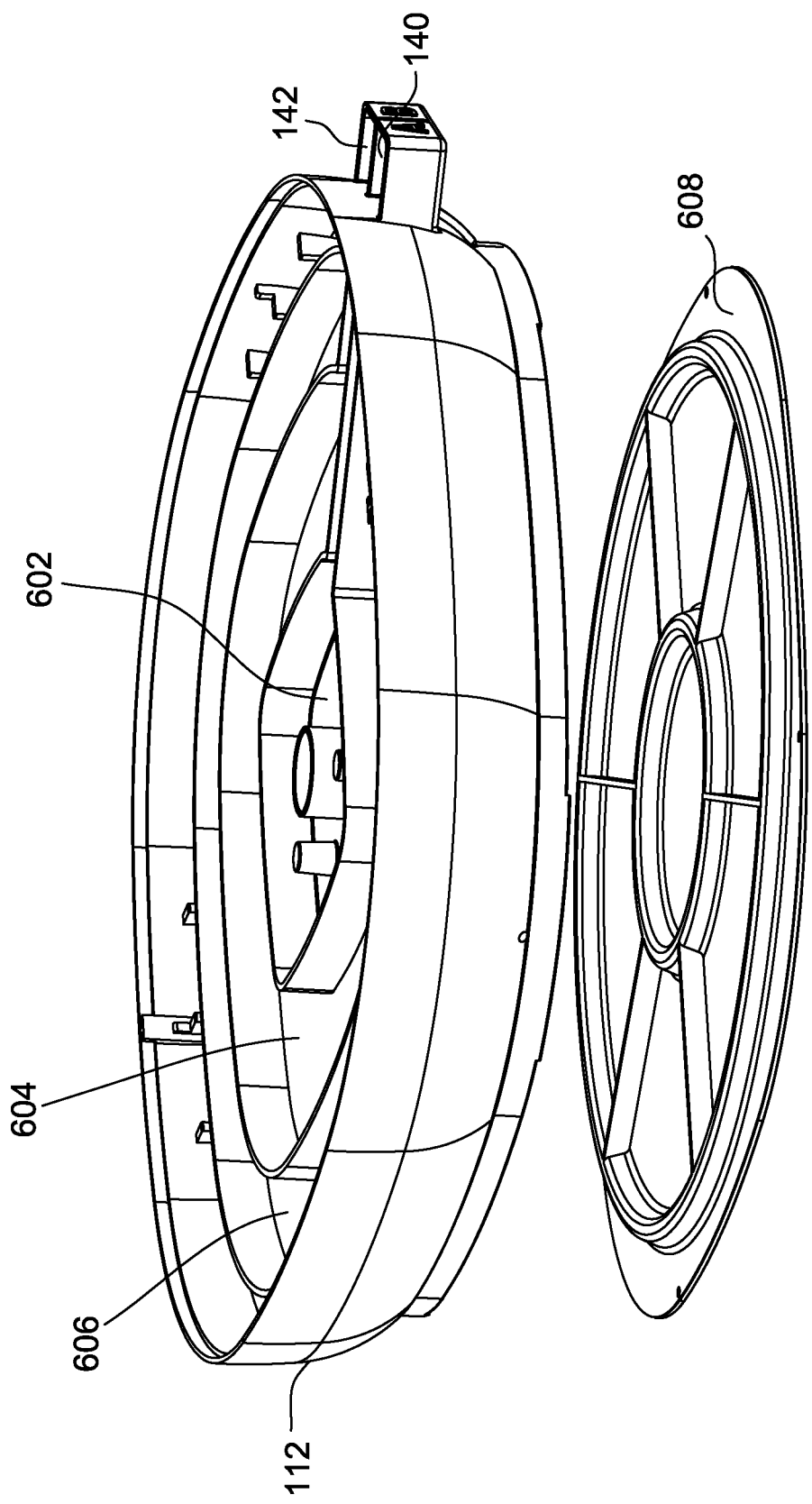
FIG. 6B is an exploded diagram of the base and bottom tray shown in FIG. 6A.

FIG. 6A is a perspective diagram of one embodiment of water troughs 602, 604, and 606 integrated into base 112 of egg incubator 100, shown in FIG. 1A and FIG. 1B. FIG. 6B is an exploded diagram of base 112 (shown in FIG. 6A) and a bottom tray 608. Base 112 includes a housing 610 having an interior 612 and an exterior 614. Interior 612 defines a lower boundary of main incubation chamber 138. Water trough 602 is disposed on interior 612 of housing 610, and covers a first portion of the total surface area of the lower boundary of main incubation chamber 138. Likewise, water troughs 604 and 606 are disposed on interior 612 of housing 610, and cover a second portion of the total surface area. The respective surface areas of water troughs 602, 604, and 606 are related to the amount of moisture they can contribute to main incubation chamber 138 when main incubation chamber 138 is closed.

Water trough 602 is isolated from water troughs 604 and 606 by at least one side wall 616. Water troughs 602, 604, and 606 are further bound by additional side walls 618. Water trough 602 is fluidly coupled to first water port 140, and water trough 604 is fluidly coupled to second water port 142. First water port 140 and second water port 142 are each coupled to exterior 614 of housing 610. Side walls 616 and 618 generally have a height that enables water troughs 602, 604, and 606 to retain a sufficient volume of water to both produce a desired humidity level and minimize, or at least reduce, the frequency of filling via water ports 140 and 142. In certain embodiments, side walls 616 and 618 are at least 5 millimeters tall, while in other embodiments side walls 616 and 618 are at least 15 millimeters tall. The precise height of side walls 616 and 618 is generally limited by the overall size of base 112.

Further, water trough 604 and water trough 606 are fluidly coupled, forming a single larger trough that is fillable through second water port 142. Accordingly, water trough 602 is smaller in surface area than the combination of water troughs 604 and 606. Water trough 602, in the embodiment of FIGS. 6A and 6B, is disposed approximately at the geometric center of interior 612 of housing 610, and water troughs 604 and 606 are disposed around water trough 602, generally surrounding water trough 602 aside from a channel 620 extending water trough 602 to first water port 140.

Water trough 602 is independently fillable from water troughs 604 and 606 to enable control of humidity within main incubator chamber 138. The amount of water in base 112 is directly related to the humidity level maintained within main incubator chamber 138. Filling water trough 602 yields a certain humidity level within main incubator chamber 138, while filling water troughs 604 and 606 yield another humidity level. A higher humidity level is achievable by filling all of water troughs 602, 604, and 606. Further, first water port 140 and second water port 142 enable filling of water troughs 602, 604, and 606 from outside of egg incubator 100. Conversely, in conventional incubators, the main incubator chamber would be opened to gain access to a water tray or other vessel for maintaining humidity. In such conventional incubators, opening the main incubator chamber results in temporary, but periodic, fluctuations in humidity and temperature that can negatively affect hatch rate. Further, in such conventional incubators, the amount of water being added is often imprecise and is difficult to achieve a precise humidity level.

Water trough 602 is dimensioned to generate, when filled, a first humidity level that is roughly sufficient for a first time segment of egg incubation. For example, for chicken eggs, water trough 602 produces a humidity level of approximately 55%, which is further adjustable by humidity adjustment knob 126, shown in FIG. 1A and FIG. 1B. Such a humidity level is appropriate for a first time segment of egg incubation, which may be, for example, about 18 days. After the first time segment of egg incubation, humidity level is increased by filling water troughs 604 and 606 via second water port 142 to a second humidity level, such as, for example, 70%. The second humidity level is appropriate up through hatching of the eggs. Generally, the additional moisture in the ambient air enables easier hatch for the birds.

Control panel 132 includes a humidity sensor (not shown) that detects the humidity level, or humidity percentage, within main incubator chamber 138. In certain embodiments, control panel 132 displays the measured humidity level and may initiate, for example, audible or visual alerts to a user that the humidity level is too high or too low for a given time during incubation. Such alerts may be initiated by transmission of an alert signal that may be received by an indicator, display, transducer (e.g., a speaker), or any other device suitable for conveying the alert to a user.

Figure 7:
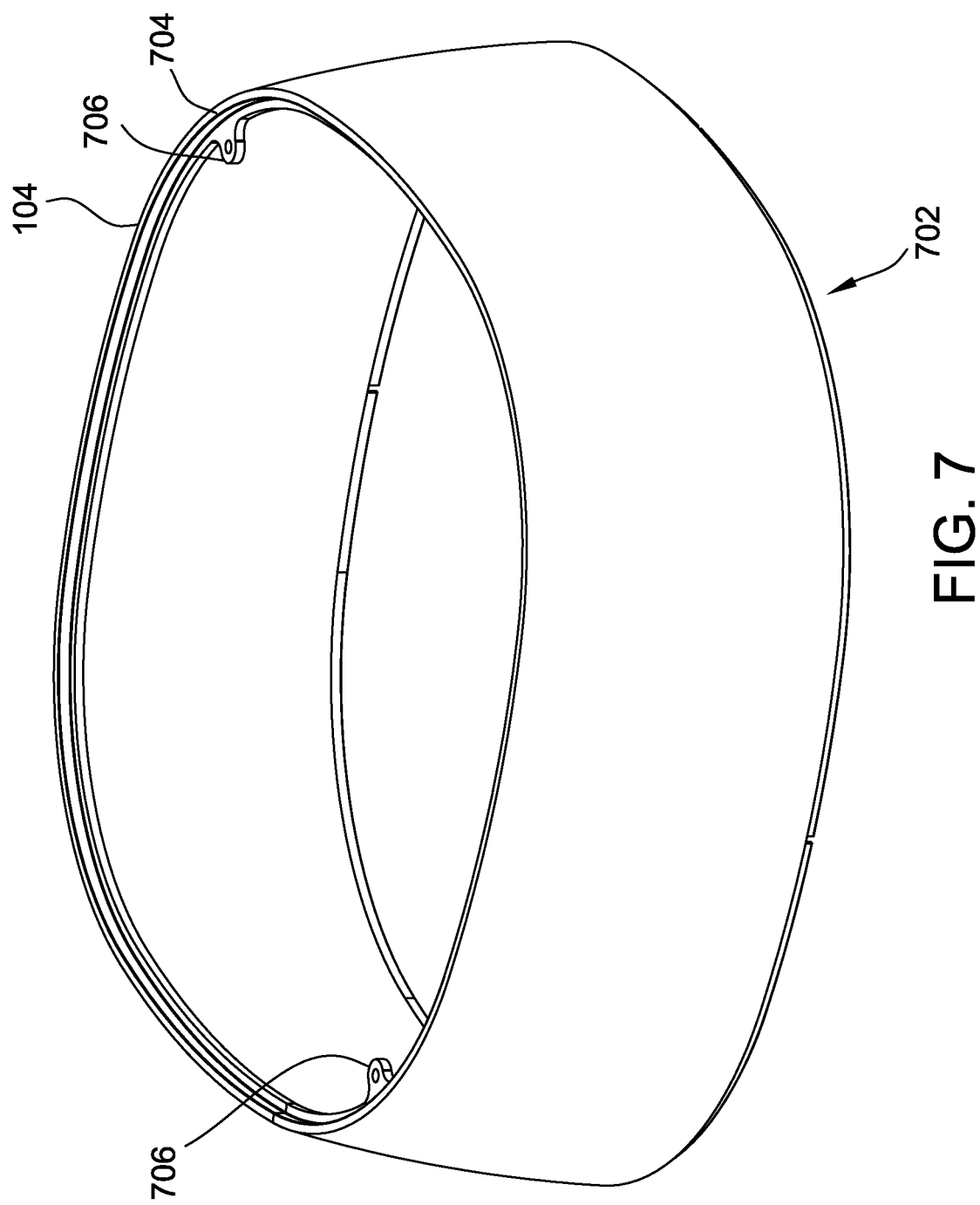
FIG. 7 is a perspective diagram of one embodiment of a window for the egg incubator shown in FIG. 1A and FIG. 1B.

FIG. 7 is a perspective diagram of one embodiment of window 104 for egg incubator 100 shown in FIG. 1A and FIG. 1B. Window 104 is generally transparent, or clear, to enable easy viewing of incubating eggs and hatching birds. Window 104 may be fabricated of a clear plastic. In alternative embodiments, window 104 may be fabricated of glass, although such an implementation is less durable and adds weight to egg incubator 100. In other alternative embodiments, window 104 may be fabricated of any other suitable material that minimizes obstructions to viewing incubating eggs and hatching birds. In certain embodiments, window 104 may exhibit a coloring or tint that still enables effective viewing of main incubator chamber 138.

Window 104 includes a lower edge 702 that engages base assembly 102 and an upper edge 704 that engages lid assembly 106. Window 104 may further include mounting points 706 for fastening window 104 to, for example, lid assembly 106. In alternative embodiments, mounting points 706 may be adjacent lower edge 702 for fastening window 104 to base assembly 102 instead of lid assembly 106.

Figure 8A:
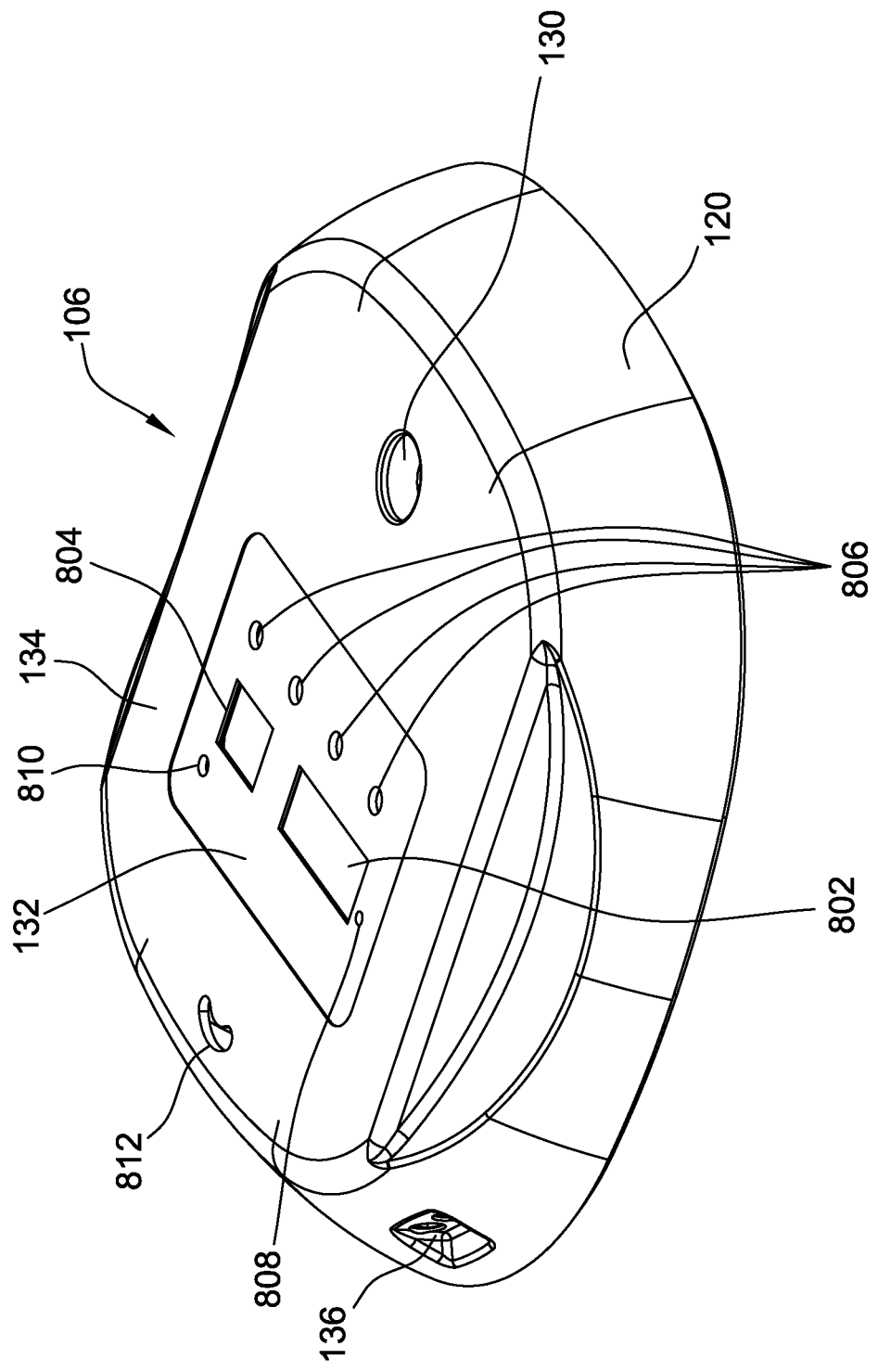
FIG. 8A is a top perspective diagram of one embodiment of a lid assembly of the egg incubator shown in FIG. 1A and FIG. 1B.
Figure 8B:
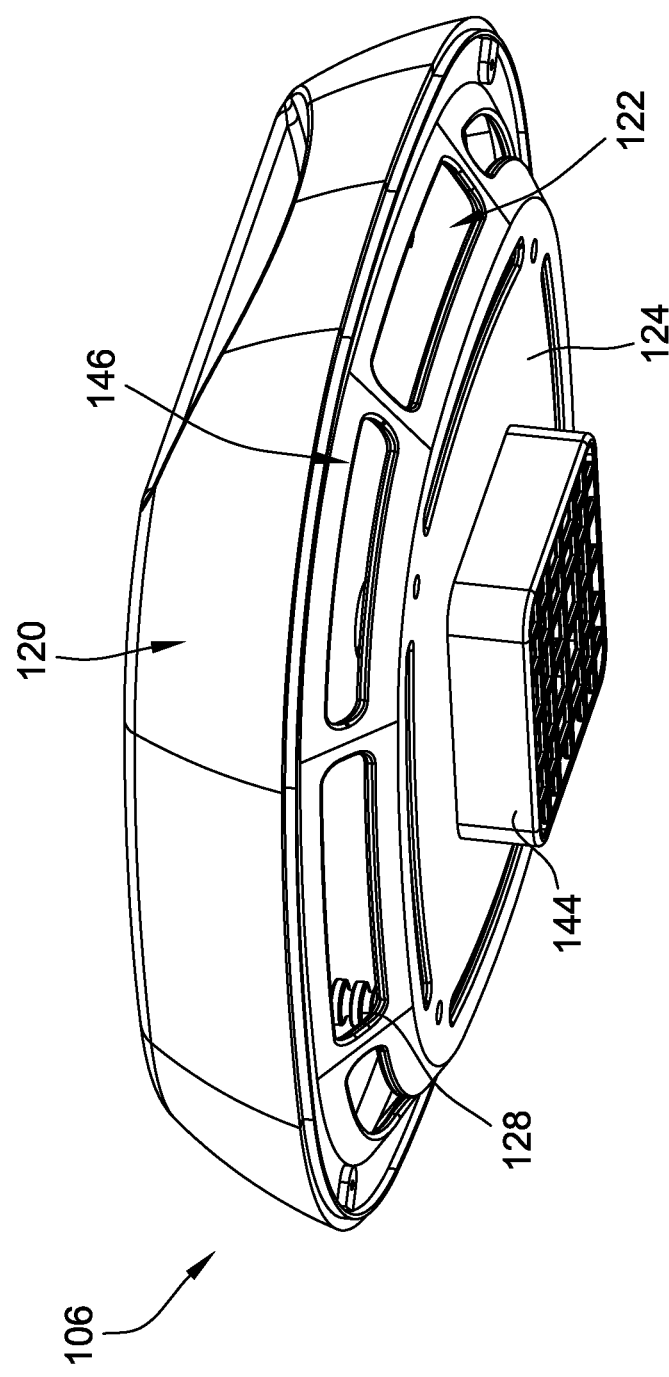
FIG. 8B is a bottom perspective diagram of the lid assembly shown in FIG. 8A.
Figure 8C:
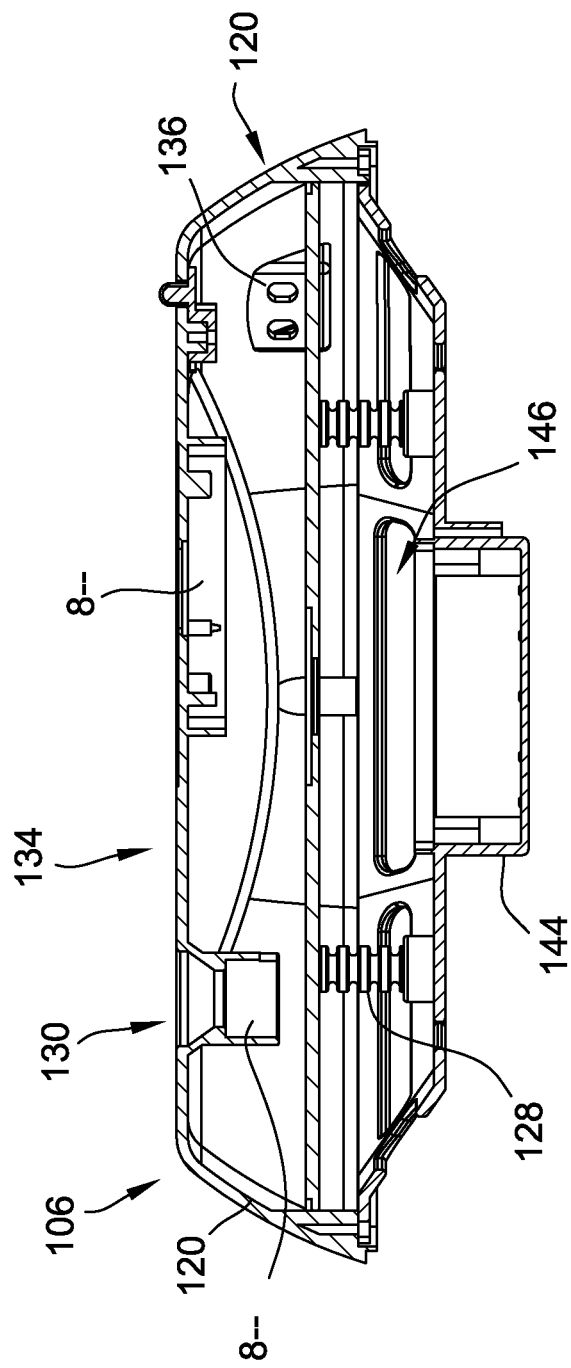
FIG. 8C is a side perspective diagram of the lid assembly shown in FIG. 8A and FIG. 8B.

FIG. 8A is a top perspective diagram of one embodiment of lid assembly 106 of egg incubator 100, shown in FIG. 1A and FIG. 1B. FIG. 8B is a bottom perspective diagram of lid assembly 106, shown in FIG. 8A. FIG. 8C is a side perspective diagram of lid assembly 106, shown in FIG. 8A and FIG. 8B. Lid assembly 106 includes lid 120, top air deflector 122, and bottom air deflector 124.

Figure 9:
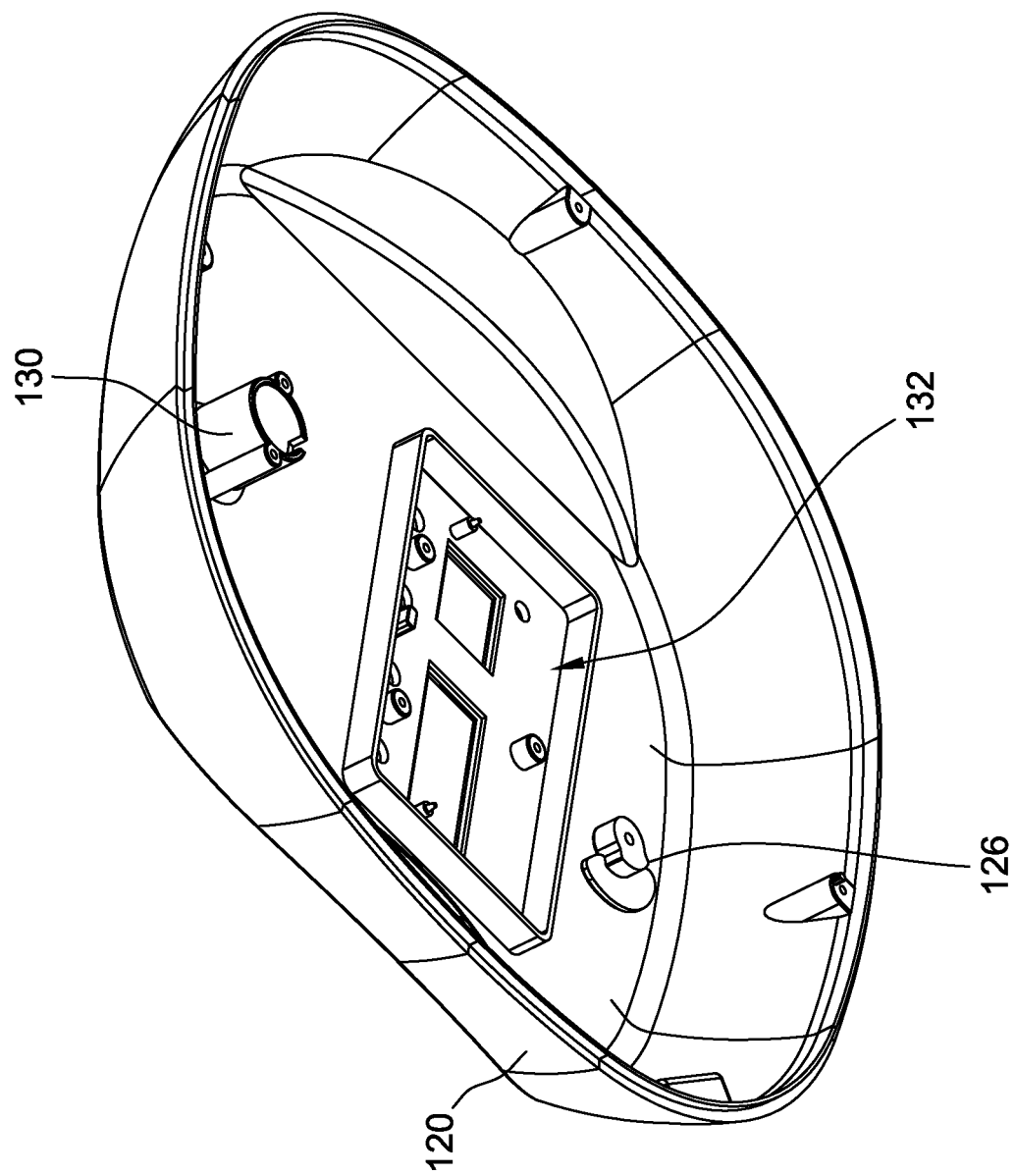
FIG. 9 is a bottom perspective diagram of a lid for the lid assembly shown in FIGS. 8A, 8B, and 8C.

FIG. 9 is a bottom perspective diagram lid 120 for lid assembly 106, shown in FIGS. 8A, 8B, and 8C. Lid 120 includes power port 136 and egg candler 130 integrated into lid 120. Lid 120 also includes control panel 132. Control panel 132 includes displays 802 and 804, buttons 806, and indicators 808 and 810 for interacting with a user. Lid 120 includes an aperture 812 configured to receive humidity adjustment knob 126. Humidity adjustment knob 126 achieves fine humidity control by adjusting the size of aperture 812 through which moist air may escape main incubator chamber 138.

Figure 10A:
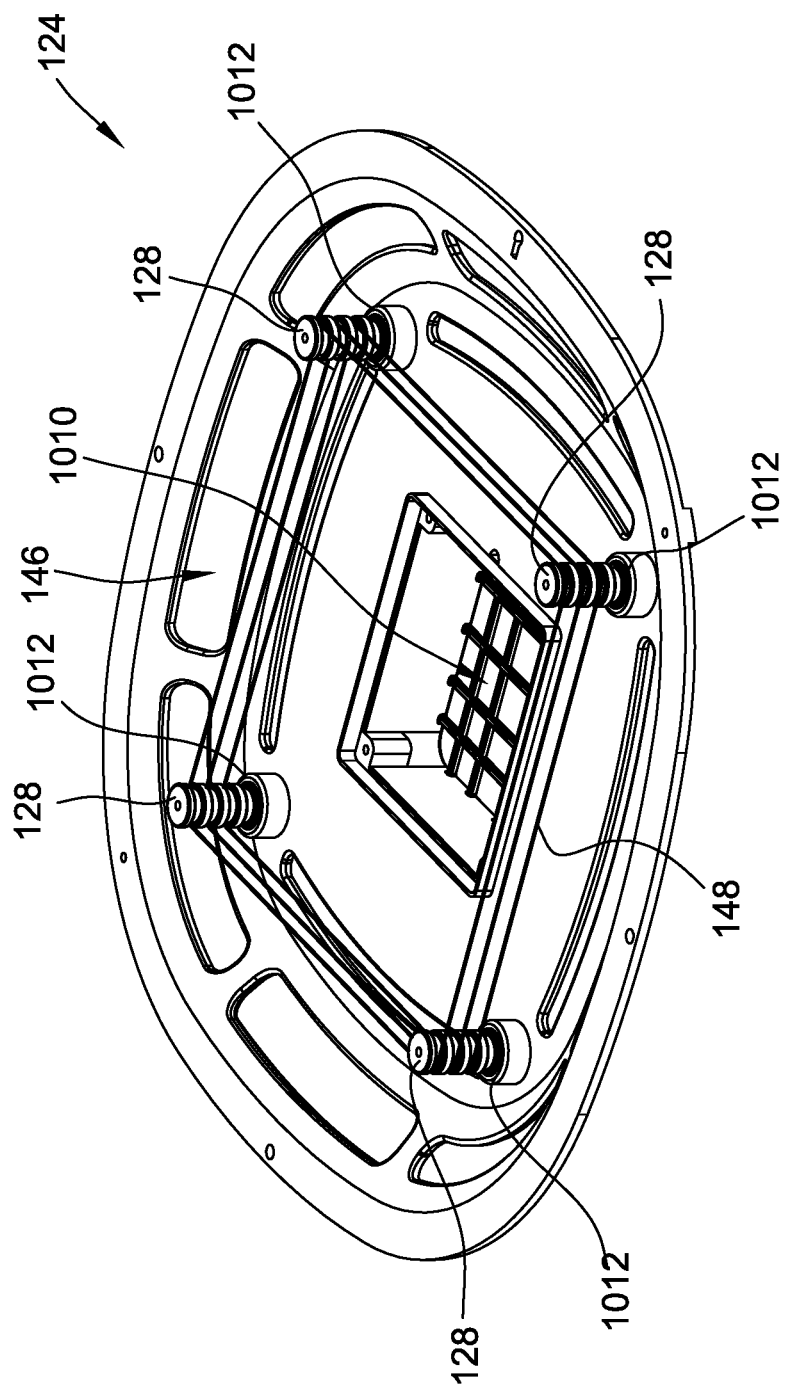
FIG. 10A is a perspective diagram of a bottom air deflector for the lid assembly shown in FIGS. 8A, 8B, and 8C.
Figure 10B:
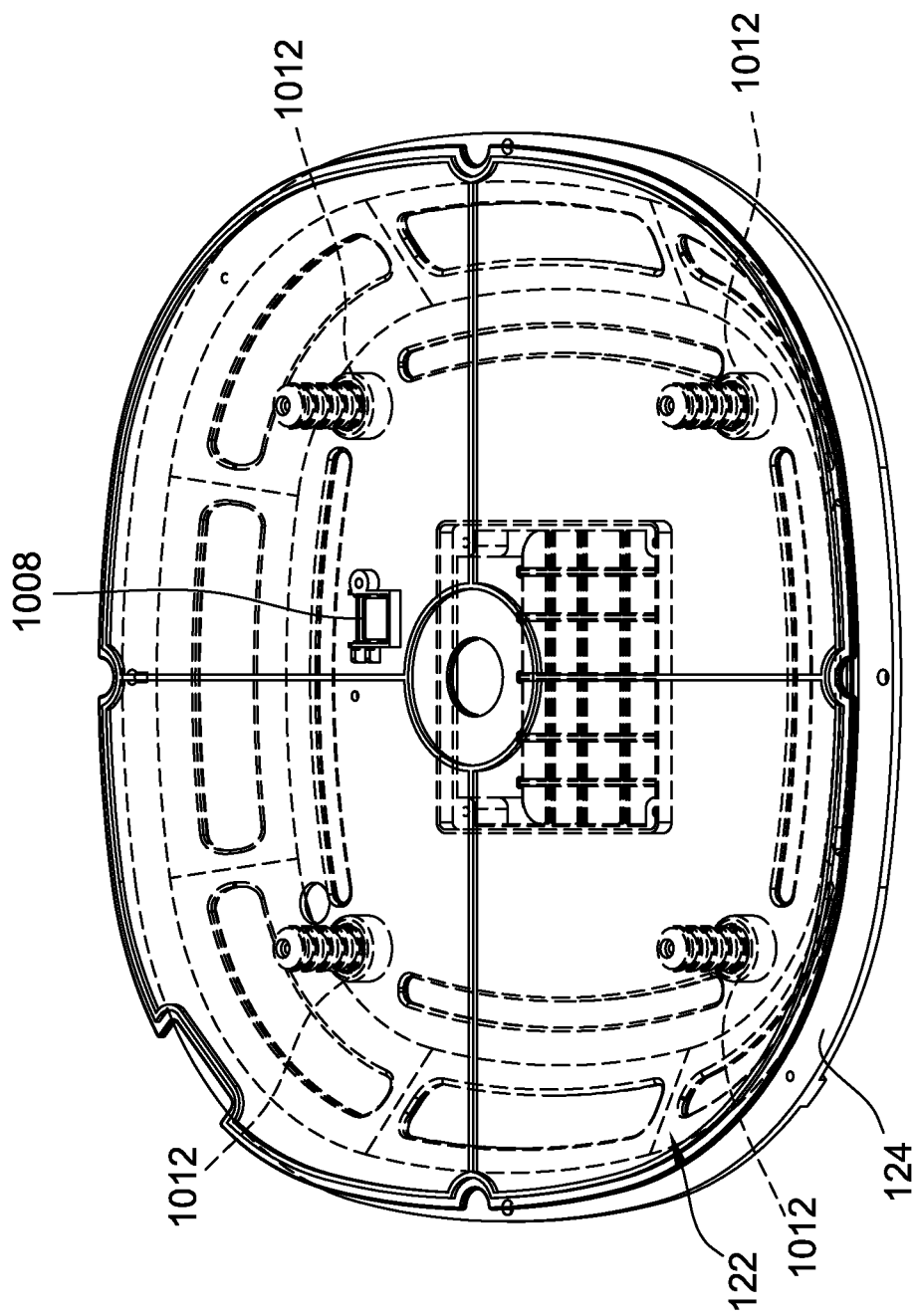
FIG. 10B is a perspective diagram of the bottom air deflector shown in FIG. 10A and a top air deflector for the lid assembly shown in FIGS. 8A, 8B, and 8C.
Figure 10C:
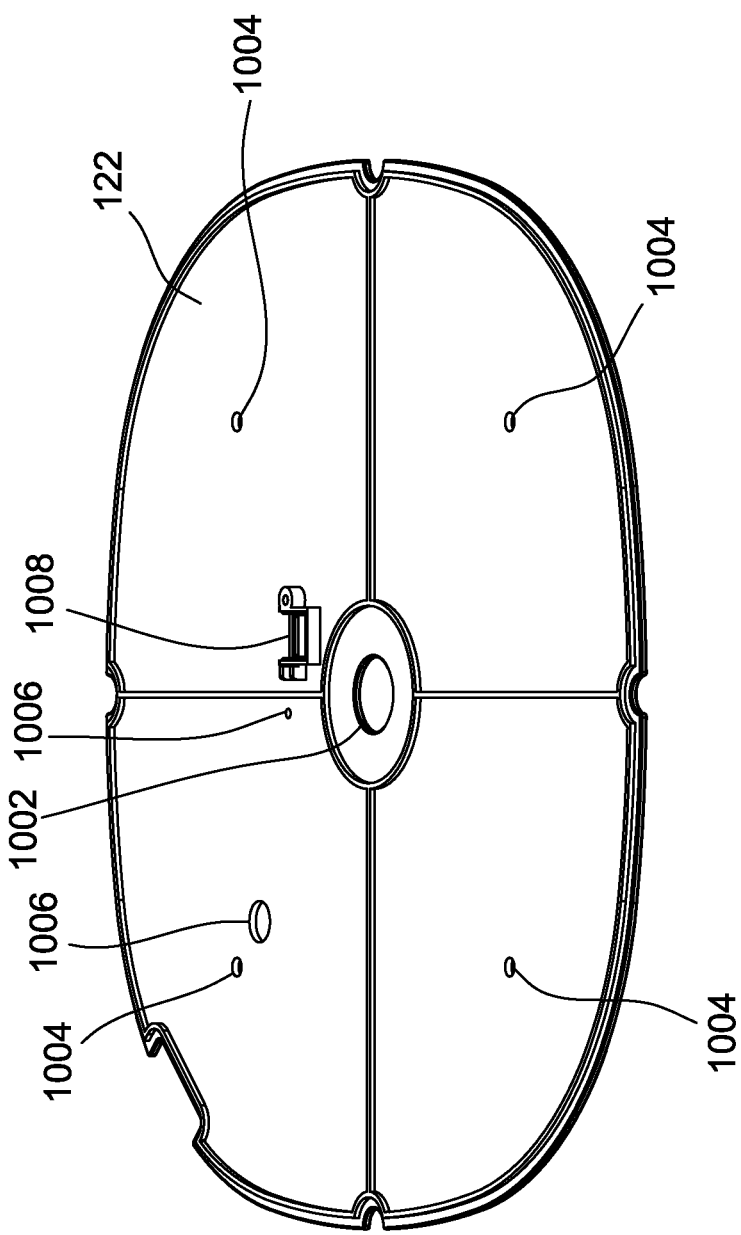
FIG. 10C is a top perspective diagram of the top air deflector shown in FIG. 10B.
Figure 10D:
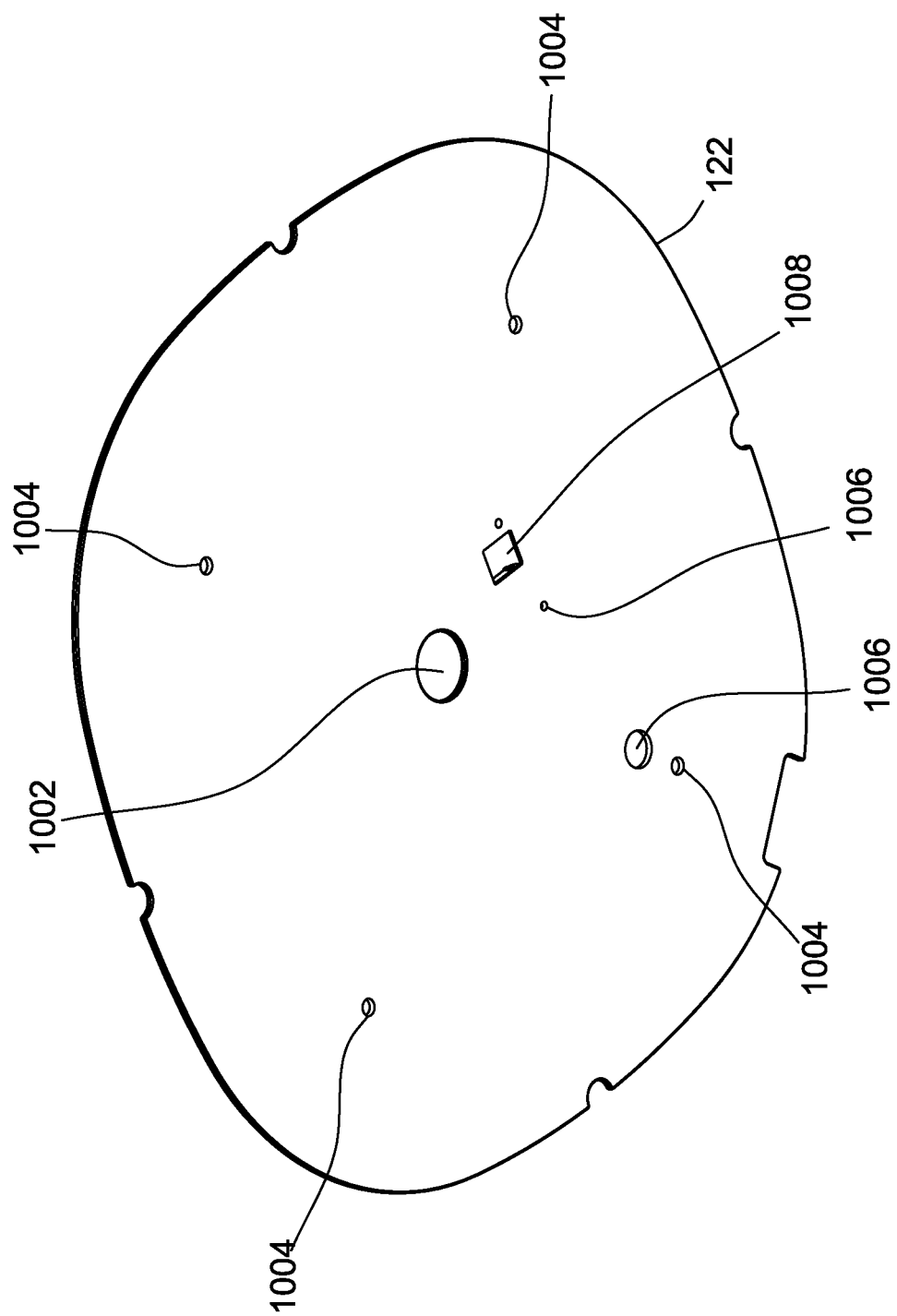
FIG. 10D is a bottom perspective diagram of the top air deflector shown in FIG. 10B.

FIG. 10A is a perspective diagram of bottom air deflector 124 for lid assembly 106, shown in FIGS. 8A, 8B, and 8C. FIG. 10B is a perspective diagram of bottom air deflector 124, shown in FIG. 10A, and top air deflector 122 for lid assembly 106, shown in FIGS. 8A, 8B, and 8C. FIG. 10C is a top perspective diagram of top air deflector 122, shown in FIG. 10B. FIG. 10D is a bottom perspective diagram of top air deflector 122, shown in FIG. 10B.

Top air deflector 122 and bottom air deflector 124 couple together to define a space in fluid communication with main incubator chamber 138 and within which circulating fan 144 and the heating element are disposed. Top air deflector 122 is primarily a solid plate having various apertures 1002, 1004, and 1006. Aperture 1002 enables a limited airflow that further enables fine control of humidity level within main incubator chamber 138. Apertures 1004 are configured to receive fasteners for coupling heating element brackets 128 to top air deflector 122. Apertures 1006 enable passage of electrical wiring for electrically coupling control panel 132 to circulating fan 144, the heating element, and various sensors disposed in main incubator chamber 138, such as, for example, a temperature sensor (not shown). Top air deflector 122 includes another aperture 1008 configured to receive a humidity sensor (not shown).

Bottom air deflector 124 includes outlet vents 146 and an inlet air vent 1010. Circulating fan 144 is configured to be disposed in inlet air vent 1010 such that it draws air from main incubator chamber 138 into the space between top air deflector 122 and bottom air deflector 124 where it is heated, and then expelled out through outlet vents 146 into main incubator chamber 138. Bottom air deflector 124 further includes receivers 1012 configured to receive heating element brackets 128.

Figure 11:
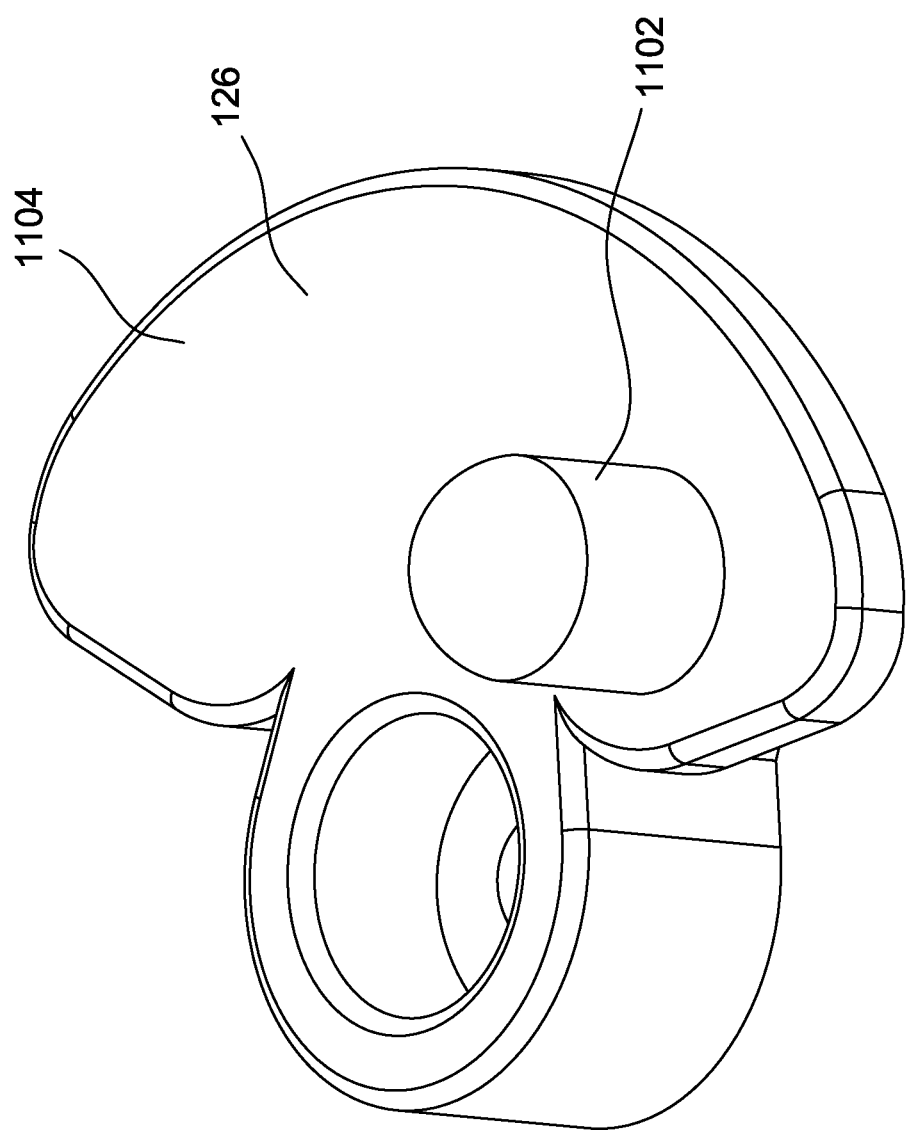
FIG. 11 is a perspective diagram of one embodiment of a humidity adjustment knob for the egg incubator shown in FIG. 1A and FIG. 1B.

FIG. 11 is a perspective diagram of one embodiment of humidity adjustment knob 126 for egg incubator 100, shown in FIG. 1A and FIG. 1B. Humidity adjustment knob 126 includes a handle 1102 coupled to a body 1104 that serves to regulate airflow through aperture 812, which further provides fine control of humidity within main incubator chamber 138.

Figure 12:
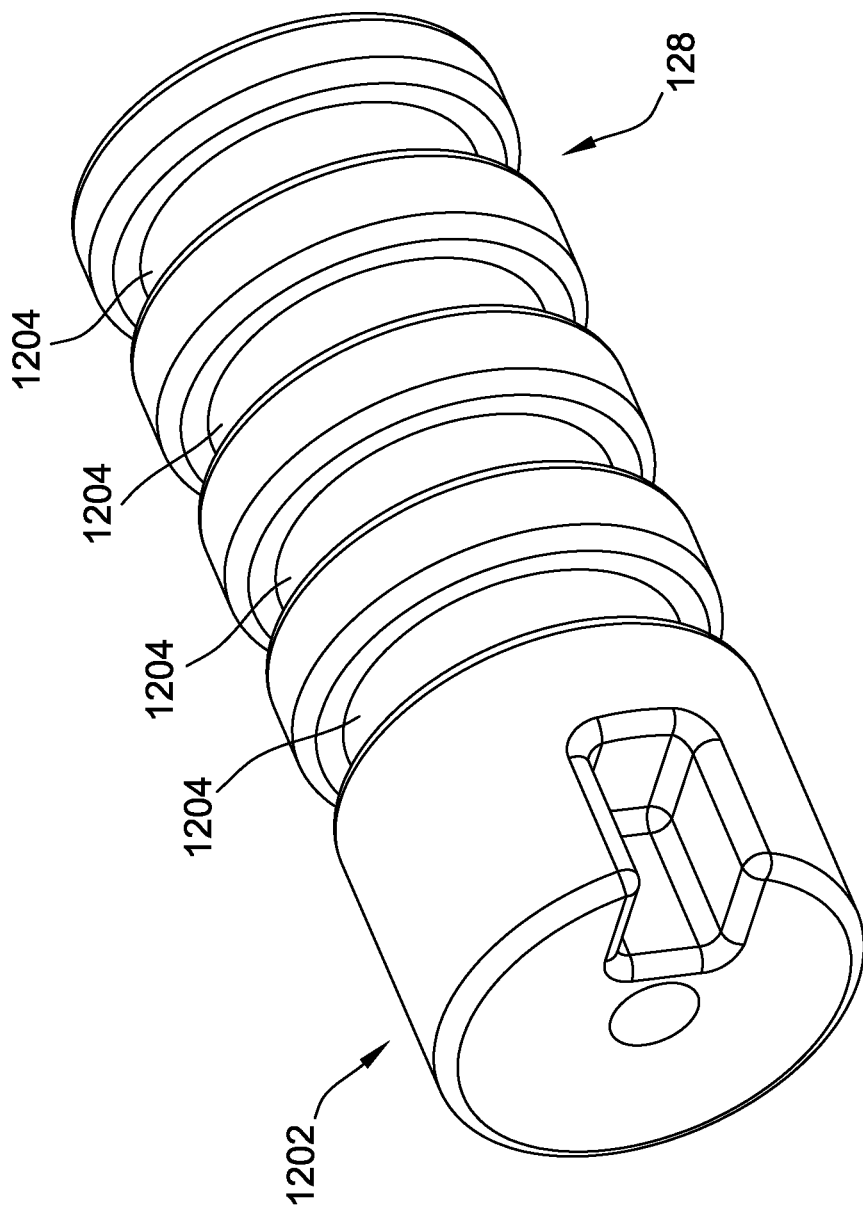
FIG. 12 is a perspective diagram of one embodiment of a heating element bracket for the egg incubator shown in FIG. 1A and FIG. 1B.

FIG. 12 is a perspective diagram of one embodiment of heating element bracket 128 for egg incubator 100, shown in FIG. 1A and FIG. 1B. Heating element bracket 128 includes a cylindrical body 1202 having one or more annular grooves 1204 configured to receive the heating element (not shown). The heating element may include, for example, a wire coil having one or more windings that respectively engage annular grooves 1204. Heating element brackets 128 are configured to be received by receivers 1012 on bottom air deflector 124. Heating element brackets 128 are further configured to receive a fastener through top air deflector 122 and, more specifically, through apertures 1004.

Figure 13:
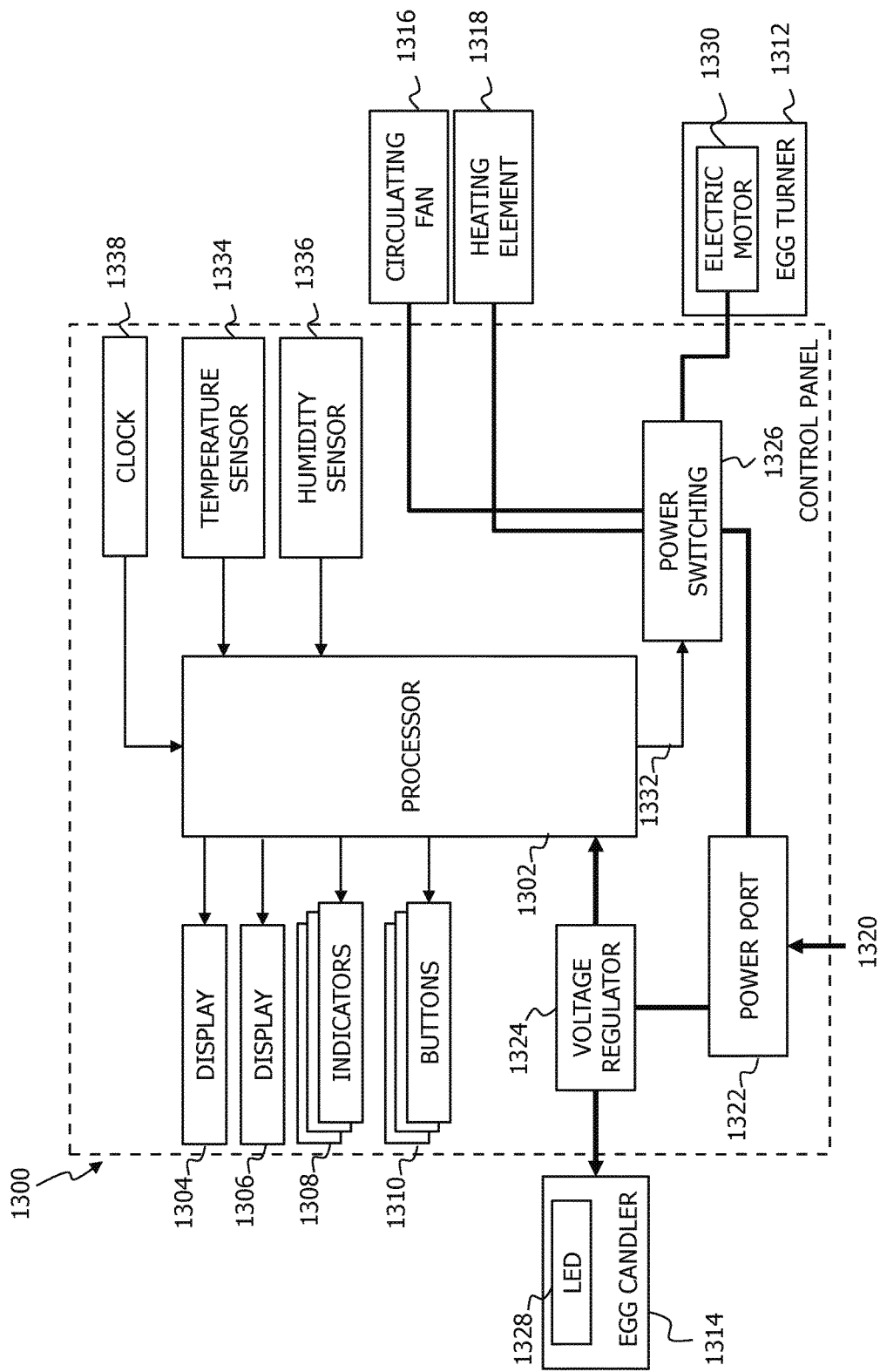
FIG. 13 is a block diagram of one embodiment of a control panel for the egg incubator shown in FIG. 1A and FIG. 1B.

FIG. 13 is a block diagram of one embodiment of a control panel 1300 for egg incubator 100 shown in FIG. 1A and FIG. 1B. Control panel 1300 includes a processor 1302 for operating egg incubator 100. Control panel 1300 includes displays 1304 and 1306, indicators 1308, and buttons 1310. Processor 1302 is programmed to control displays 1304 and 1306 to display, for example, measured temperature, temperature set point, humidity, and incubation time. In alternative embodiments, processor 1302 is further programmed to control displays 1304 and 1306 to display various other information related to incubation, including, for example, status of an egg turner 1312, status of an egg candler 1314, status of a circulating fan 1316, or status of a heating element 1318. In certain embodiments, processor 1302 is programmed to control indicators 1308 to convey such information regarding, for example, egg turner 1312, egg candler 1314, circulating fan 1316, or heating element 1318. In certain embodiments, processor 1302 is further programmed to generate an audible or visible alert regarding humidity level or temperature within main incubator chamber 138.

Processor 1302 is programmed to receive inputs from buttons 1310. Inputs received from buttons 1310 may include menu selections, display settings, and increment/decrement of control parameters such as temperature set point, days of incubation, or frequency of egg turning, for example.

Control panel 1300 is supplied DC power 1320 through a power port 1322. In certain embodiments, for example, DC power 1320 is a 12 Volt DC supply. In alternative embodiments, control panel 1300 may be supplied AC power that is then converted to suitable frequency and voltage for use by processor 1302 and other components of control panel 1300. Control panel 1300 includes a voltage regulator 1324 and power switching devices 1326 for regulating power supplied to various components of control panel 1300. For example, voltage regulator 1324 converts DC power 1320 to a level suitable for digital electronics including, for example, processor 1302 and an LED 1328 of egg candler 1314. In certain embodiments, voltage regulator 1324 converts DC power 1320 from, for example, 12 VDC to 5 VDC, or from 12 VDC to 3.3 VDC. Power switching devices 1326 control supply of DC power 1320 to other electrical components, including, for example, circulating fan 1316, heating element 1318, and an electric motor 1330 of egg turner 1312.

Power switching devices 1326 control the supply of DC power 1320 based on one or more power control signals 1332 generated by processor 1302 in response to one or more stimulus received at processor 1302. Power switching devices 1326 may include one or more semiconductor switches such as, for example, power metal-oxide silicon field effect transistors (MOSFETs), insulated gate bipolar transistors (IGBTs), or other suitable semiconductor switches for switching power under load. In alternative embodiments, power switching devices 1326 may include electromechanical relays.

For example, processor 1302 enables supply of DC power 1320 to heating element 1318 when a measured temperature falls below a threshold temperature, such as a temperature set point. Control panel 1300 includes a temperature sensor 1334 that is disposed in the main incubation chamber of the egg incubator, such as, for example, main incubation chamber 138 of egg incubator 100, both shown in FIGS. 1A and 1B. In certain embodiments, processor 1302 enables supply of DC power 1320 to circulating fan 1316 at any time that heating element 1318 is energized to ensure proper air circulation for heating the main incubation chamber.

Another example of stimulus is processor 1302 receives a measured humidity from a humidity sensor 1336 disposed in or near the main incubation chamber. If the measured humidity level is too far below or too far above a humidity set point, processor 1302, in certain embodiments, may initiate an audible or visual alert to a user using, for example, displays 1304 or 1306, or indicators 1308.

Processor 1302 controls power switching devices 1326 to supply DC power 1320 to electric motor 1330 periodically to turn egg turner 1312. For example, in one embodiment, electric motor 1330 may include a DC stepper motor and processor 1302 is programmed to periodically supply DC power 1320 to the DC stepper motor to increment its position, thereby turning egg turner 1312.

Control panel 1300 includes a clock 1338 that generates a clock signal that is supplied to processor 1302 for use in controlling various components of control panel 1300. For example, processor 1302 may utilize the clock signal to determine a time interval between engaging egg turner 1312. Similarly, processor 1302 may utilize the clock signal to determine an interval between heating cycles of heating element 1318, duration of heating cycles, or a duration of operation of circulating fan 1316.

Control panel 1300 operates egg candler 1314 in response to actuation of one or more of buttons 1310. In certain embodiments, for example, one of buttons 1310 is a dedicated button that couples and decouples LED 1328 of egg candler 1314 to a regulated voltage output of voltage regulator 1324. In alternative embodiments, processor 1302 detects an actuation of one or more of buttons 1310 to enable egg candler 1314. In response to the actuation, processor 1302 may transmit a control signal to a switching device, such as, for example, one or more MOSFETs to supply the regulated voltage to LED 1328. In certain embodiments, the switching device is latched to a closed state with a single button actuation, and commutated to an opened state with a second button actuation.

The methods and systems described herein may be implemented using computer programming or engineering techniques including computer software, firmware, hardware, or any combination or subset thereof, wherein the technical effect may include at least one of: (a) reducing size and cost of an egg incubator with automatic heat control, humidity control, and egg turning; (b) enabling removal of the automatic egg turner without manual handling of eggs; (c)

improving humidity control with independently filled water troughs; (d) reducing fluctuations in temperature and humidity by enabling filling of water troughs from one or more external water ports; (e) integrating an egg candling function into the egg incubator; (f) enabling turning of eggs lying flat; (g) automatic cessation of egg turning a predetermined period of time prior to hatch; (h) improving viewable space by incorporating a 360 degree clear window; and (i) further improving humidity control using a humidity adjustment knob for fine adjustments airflow from the egg incubator.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above examples are exemplary only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An egg incubator, comprising:
  a base assembly including:
    a base tray configured to support a plurality of eggs,
    a water trough beneath the base tray and configured to retain a quantity of water; and
    a motorized egg turner configured to periodically turn the plurality of eggs the motorized egg turner comprising:
      a hub,
      a first ring concentric with the hub, and
      a first plurality of spokes extending radially from the hub to the first ring and defining a first plurality of compartments sized to respectively receive the plurality of eggs therein, wherein each of the first plurality of spokes is circumferentially-spaced from an adjacent spoke of the first plurality of spokes, wherein each of the first plurality of spokes comprises:

a radial member extending from the hub toward the first ring to define a portion of a boundary between a first compartment and a second compartment, of the first plurality of compartments, the first compartment adjacent to the second compartment, a first diverging member extending from the radial member at an intermediate position between the hub and the first ring, the first diverging member extending obliquely from the radial member to the first ring to define a portion of a boundary of the first compartment, and a second diverging member extending obliquely from the radial member, at the intermediate position, to the first ring to define a portion of a boundary of the second compartment, wherein a first diverging member of a first spoke, of the first plurality of spokes, that defines a first portion of the boundary of the first compartment, is parallel to a second diverging member of a second spoke, of the first plurality of spokes and adjacent to the first spoke, and that defines a second portion of the boundary of the first compartment;

a window removably coupled to the base assembly; and a lid assembly coupled to the window, the base assembly, window, and the lid assembly enclosing a main incubation chamber sized to hold a plurality of eggs therein, the lid assembly including:

a heating element configured to heat the main incubation chamber to a desired temperature; and a circulating fan configured to generate an airflow over the heating element.

2. The egg incubator of claim 1, wherein the lid assembly further comprises an egg candler.

3. The egg incubator of claim 1, wherein the base assembly comprises a first external water port in fluid communication with the water trough, the first external water port enables filling of the water trough without opening the main incubation chamber.

4. The egg incubator of claim 3, wherein the base assembly further comprises a second water trough in fluid communication with a second external water port, the first external water port and the second external water port configured to be independently filled.

5. The egg incubator of claim 1, wherein the motorized egg turner comprises:

an electric motor having a drive shaft; and an egg turner wheel having a hub defining a shaft aperture, the shaft aperture sized to receive the drive shaft of the electric motor therethrough.

6. The egg incubator of claim 5, wherein the drive shaft of the electric motor mates with the shaft aperture of the egg turner wheel.

7. The egg incubator of claim 5, wherein the electric motor comprises a direct current (DC) stepper motor.

8. The egg incubator of claim 5, wherein the egg turner wheel comprises a plurality of rings and radial spokes that cooperate to define a plurality of compartments sized to receive one of the plurality of eggs therein.

9. The egg incubator of claim 8, wherein the rings and the radial spokes are dimensioned such that the plurality of compartments are each larger than each of the plurality of eggs.

10. The egg incubator of claim 9, wherein the egg turner wheel is configured to be removably coupled to the drive shaft of the electric motor, and wherein the egg turner wheel is removable from the egg incubator without handling the plurality of eggs.

11. The egg incubator of claim 1 further comprising a processor configured to periodically enable the motorized egg turner to turn the plurality of eggs for a predetermined period of time prior to an expected hatch.

12. A motorized egg turner for an egg incubator, the motorized egg turner comprising:

a base tray sized to receive a plurality of eggs thereon;

an egg turner wheel axially-spaced from the base tray, the egg turner wheel comprising:

a hub having a shaft aperture defined therein, a first ring concentric with the hub, and a first plurality of spokes extending radially from the hub to the first ring and defining a first plurality of compartments sized to respectively receive the plurality of eggs therein, wherein each of the first plurality of spokes is circumferentially-spaced from an adjacent spoke of the first plurality of spokes, wherein each of the first plurality of spokes comprises:

a radial member extending from the hub toward the first ring to define a portion of a boundary between a first compartment and a second compartment, of the first plurality of compartments, the first compartment adjacent to the second compartment, a first diverging member extending from the radial member at an intermediate position between the hub and the first ring, the first diverging member extending obliquely from the radial member to the first ring to define a portion of a boundary of the first compartment, and a second diverging member extending obliquely from the radial member, at the intermediate position, to the first ring to define a portion of a boundary of the second compartment, wherein a first diverging member of a first spoke, of the first plurality of spokes, that defines a first portion of the boundary of the first compartment, is parallel to a second diverging member of a second spoke, of the first plurality of spokes and adjacent to the first spoke, and that defines a second portion of the boundary of the first compartment; and an electric motor having a drive shaft extending axially through the shaft aperture of the hub, the electric motor configured to rotate the drive shaft and the egg turner wheel with respect to the base tray, and further configured to cause the first plurality of spokes to engage the plurality of eggs to turn the plurality of eggs.

13. The motorized egg turner of claim 12, wherein the first plurality of spokes are configured to turn the plurality of eggs approximately about respective longitudinal axes extending from a first end to a second end of each egg of the plurality of eggs.

14. The motorized egg turner of claim 12, wherein the egg turner wheel is selectively removable from the drive shaft.

15. The motorized egg turner of claim 12, wherein the egg turner wheel further comprises:

a second ring concentric with the hub and the first ring, and spaced radially outward from the first ring; and a second plurality of spokes extending radially from the first ring to the second ring, the second plurality of spokes defining a second plurality of compartments sized to each receive one of the plurality of eggs therein.

16. The motorized egg turner of claim 15, wherein each of the second plurality of spokes is circumferentially-spaced from an adjacent spoke of the second plurality of spokes.

* * * * *